United States Patent [19]

Blanton et al.

[11] Patent Number: 4,731,861
[45] Date of Patent: Mar. 15, 1988

[54] METHOD OF OPTICAL CHARACTER RECOGNITION

[75] Inventors: Keith A. Blanton, Plano; Steven N. Petersen, Carrollton; Ramon E. Helms, Plano, all of Tex.

[73] Assignee: Texas Instruments Incorporated, Dallas, Tex.

[21] Appl. No.: 527,155

[22] Filed: Aug. 26, 1983

[51] Int. Cl.⁴ .............................................. G06K 9/20
[52] U.S. Cl. ............................................ 382/48; 382/9
[58] Field of Search ....................................... 382/9, 48

[56] References Cited

U.S. PATENT DOCUMENTS

| | | | |
|---|---|---|---|
| 3,295,105 | 12/1966 | Gray et al. | 382/48 |
| 4,013,999 | 3/1977 | Erwin et al. | 382/48 |
| 4,034,341 | 7/1977 | Isono et al. | 382/48 |
| 4,558,461 | 12/1985 | Schlang | 382/48 |

Primary Examiner—Leo H. Boudreau
Attorney, Agent, or Firm—William E. Hiller; N. Rhys Merrett; Melvin Sharp

[57] ABSTRACT

A method for scanning a page and locating individual characters on that page so that character recognition can be performed is disclosed. A page containing characters to be read is scanned with successive scan lines from top to bottom and the data contained in each scan line is transmitted to a buffer memory for temporary storage. An additional set of data which represents the significant amount of character information within a scan line is also generated and stored in a separate memory. When the microprocessor is ready to begin recognizing characters the set of data which indicates those scan lines containing significant character data is accessed and read. The microprocessor then accesses a different set of data which represents the significant character information as arranged in vertical pixel lines. When the microprocessor locates a vertical pixel line having significant character information the microprocessor then begins reading data from the buffer memory at locations as determined by the external data sets. The microprocessor does not read data in the buffer memory unless it corresponds to areas in which significant character data is located. The microprocessor is able to quickly scan an entire page and locate all characters within the page to provide for fast optical character recognition.

15 Claims, 44 Drawing Figures

Microfiche Appendix Included
(2 Microfiche, 170 Pages)

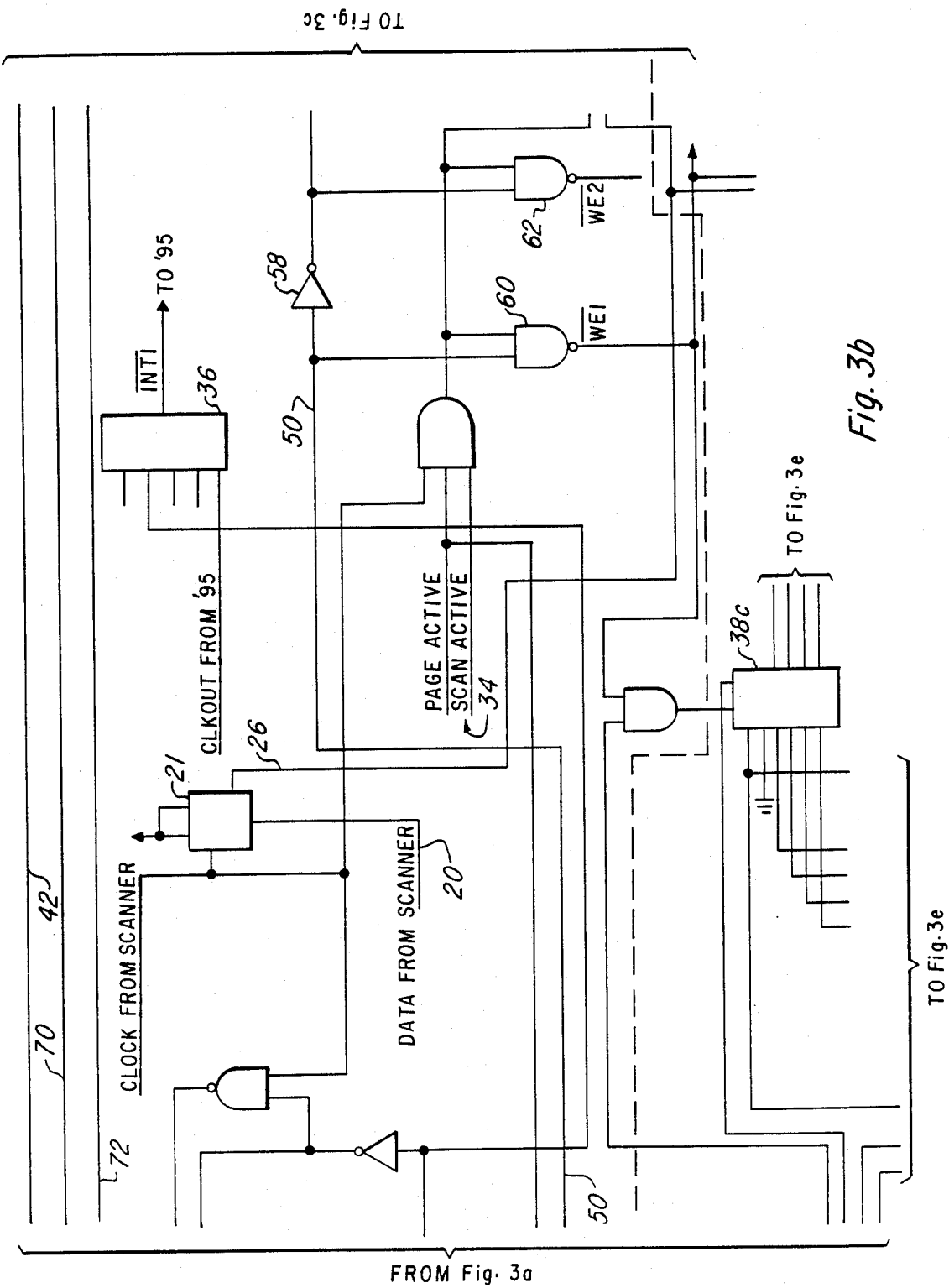

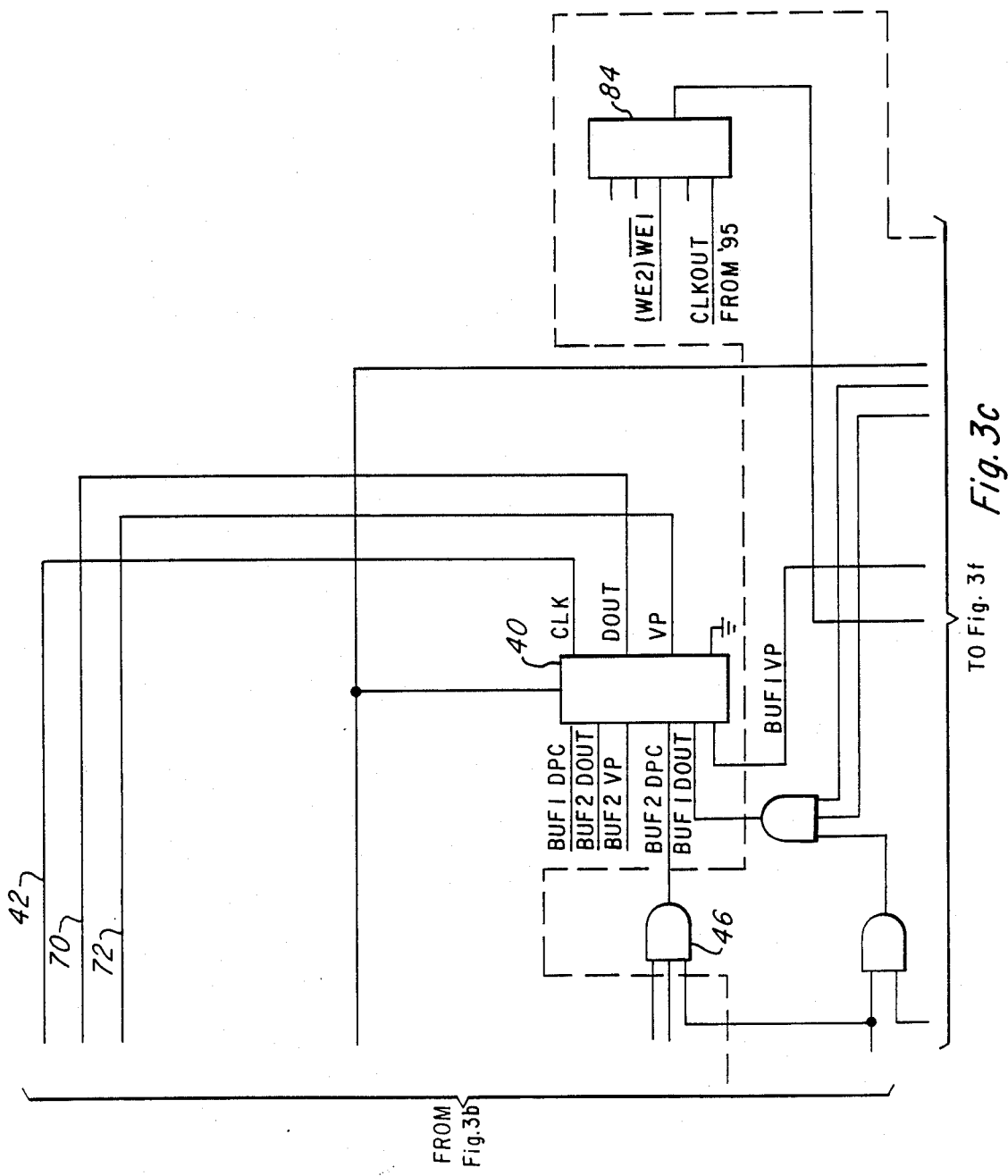

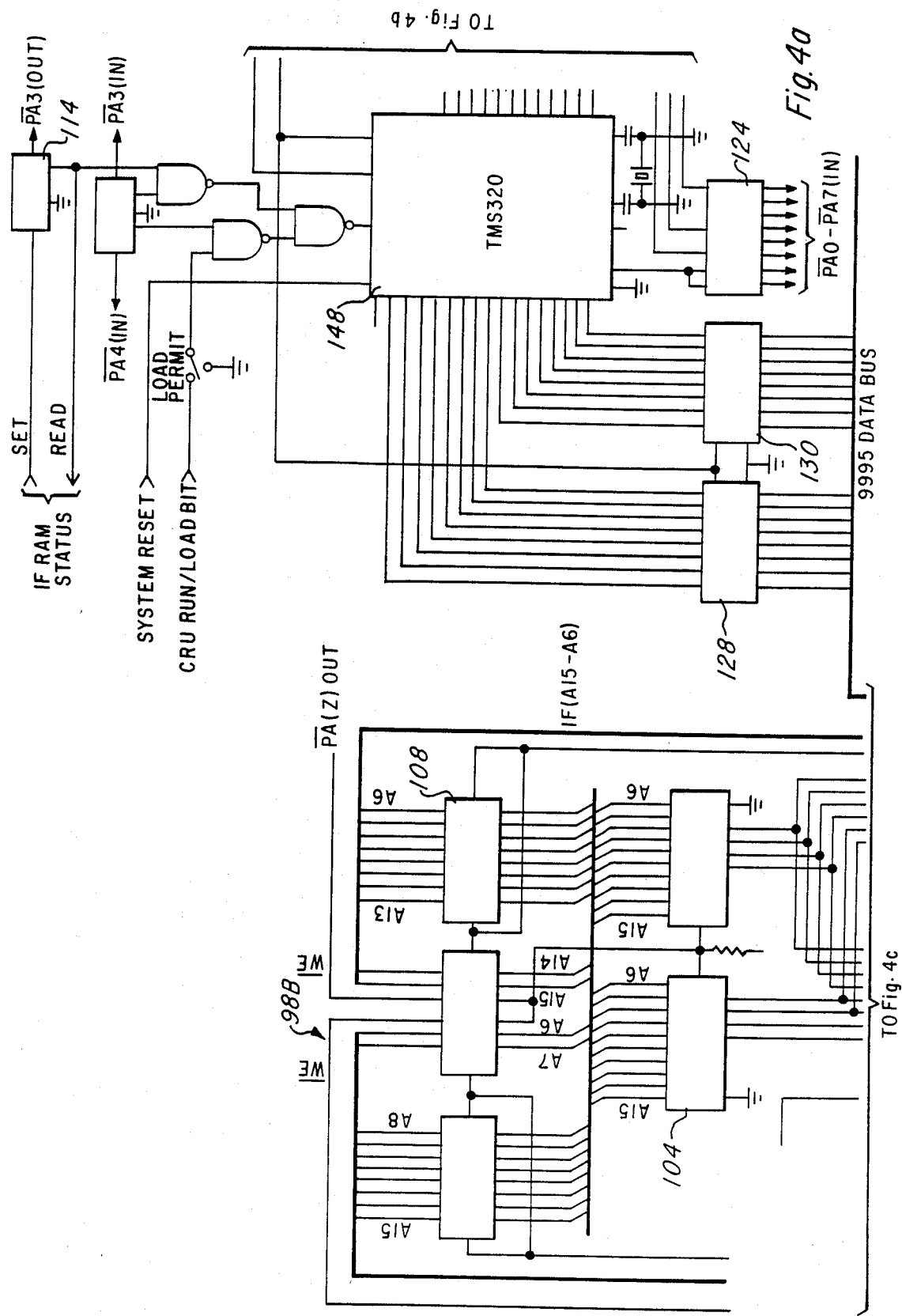

| STEP | A | L | STEP | A | L | STEP | A | L |
|---|---|---|---|---|---|---|---|---|
| 1 | 0 | -1 | 32 | 80 | 3 | 63 | 120 | -1 |
| 2 | 1 | -1 | 33 | 80 | 4 | 64 | 121 | -1 |
| 3 | 2 | -1 | 34 | 80 | 5 | 65 | 121 | -2 |
| 4 | 2 | 2 | 35 | 80 | 6 | 66 | 123 | -2 |
| 5 | 4 | 2 | 36 | 86 | 6 | 67 | 123 | -3 |
| 6 | 6 | 2 | 37 | 92 | 6 | 68 | 123 | -4 |
| 7 | 6 | 3 | 38 | 98 | 6 | 69 | 123 | -5 |
| 8 | 9 | 3 | 39 | 104 | 5 | 70 | 123 | -6 |
| 9 | 9 | 4 | 40 | 104 | 4 | 71 | 129 | -6 |
| 10 | 13 | 4 | 41 | 104 | 4 | 72 | 129 | -7 |
| 11 | 13 | 5 | 42 | 100 | 3 | 73 | 136 | -7 |
| 12 | 13 | 6 | 43 | 100 | 2 | 74 | 136 | -8 |
| 13 | 19 | 6 | 44 | 100 | 1 | 75 | 144 | -8 |
| 14 | 19 | 7 | 45 | 100 | 0 | 76 | 152 | -8 |
| 15 | 26 | 7 | 46 | 100 | -1 | 77 | 160 | -8 |
| 16 | 26 | 8 | 47 | 100 | -1 | 78 | 168 | -8 |
| 17 | 34 | 8 | 48 | 99 | -2 | 79 | 168 | -7 |
| 18 | 42 | 8 | 49 | 99 | -2 | 80 | 175 | -7 |
| 19 | 50 | 8 | 50 | 101 | -3 | 81 | 175 | -6 |
| 20 | 58 | 8 | 51 | 101 | -4 | 82 | 181 | -6 |
| 21 | 66 | 7 | 52 | 101 | -5 | 83 | 181 | -6 |
| 22 | 66 | 6 | 53 | 101 | -6 | 84 | 186 | -5 |
| 23 | 66 | 6 | 54 | 101 | -6 | 85 | 186 | -5 |
| 24 | 72 | 5 | 55 | 107 | -6 | 86 | 186 | -4 |
| 25 | 72 | 4 | 56 | 113 | -6 | 87 | 186 | -3 |
| 26 | 72 | 4 | 57 | 119 | -5 | 88 | 189 | -3 |
| 27 | 76 | 3 | 58 | 119 | -4 | 89 | 189 | -2 |
| 28 | 76 | 2 | 59 | 119 | -3 | 90 | 191 | -2 |
| 29 | 76 | 2 | 60 | 119 | -2 | 91 | 191 | -1 |
| 30 | 78 | 2 | 61 | 119 | -1 | 92 | 192 | -1 |
| 31 | 80 | 2 | 62 | 119 | -1 | 93 | 193 | -1 |
|  |  |  |  |  |  |  | 193 | 0 |

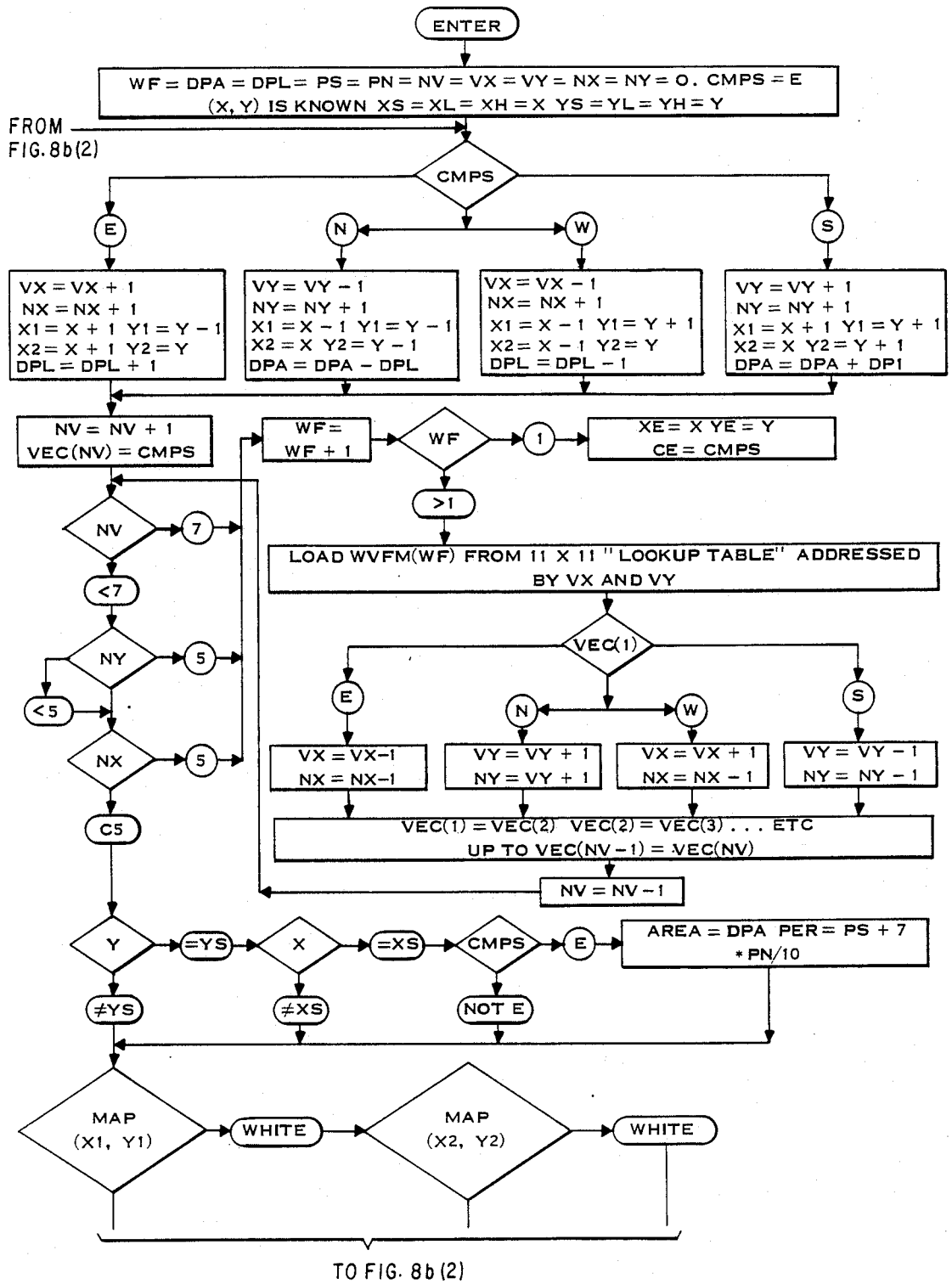
Fig. 8b(1)

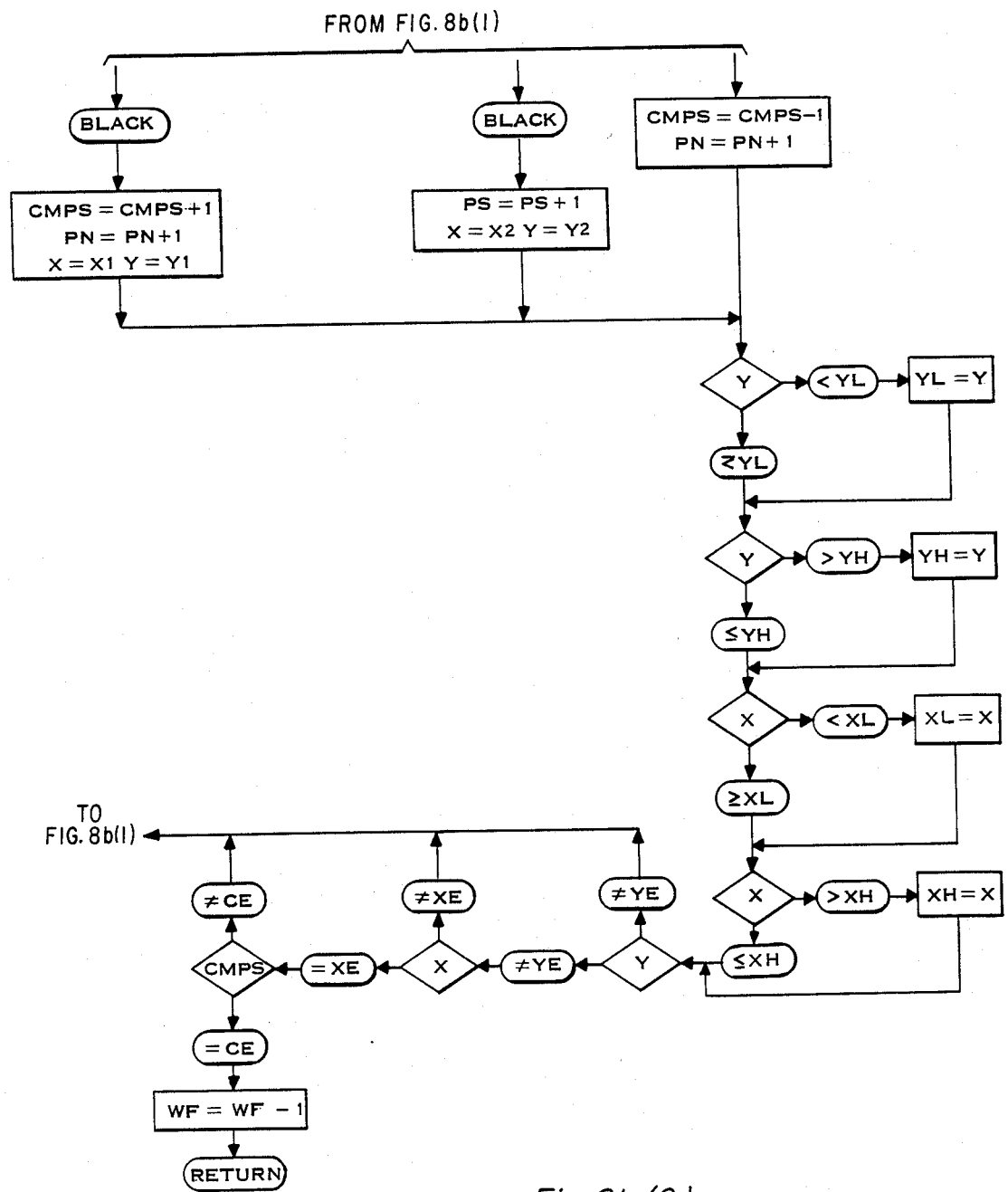
Fig. 8b (2)

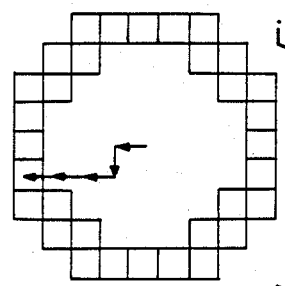
Fig.9e STEP 8
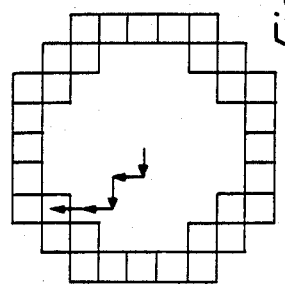
Fig.9d STEP 7
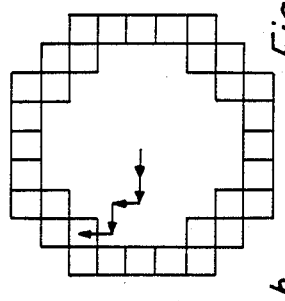
Fig.9c STEP 6
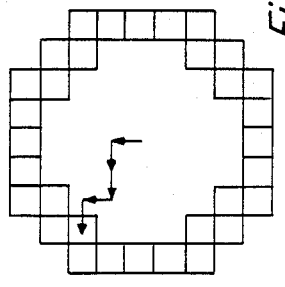
Fig.9b STEP 5
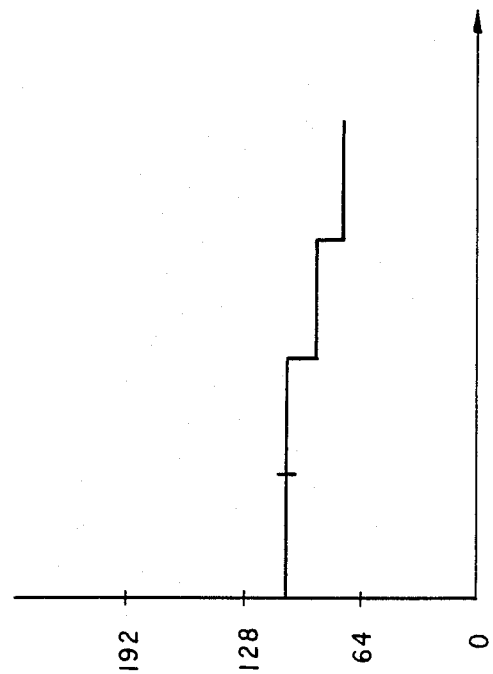
Fig.9a
Fig.9f

SIZE NORMALIZATION

PATH LENGTH → CHECK FOR DC BIAS=SLANT

PATH LENGTH → NOW COMPARE:

PATH LENGTH → LOCATE PRIMARY BUOYS

PATH LENGTH → LOCATE SECONDARY BUOYS

METHOD OF OPTICAL CHARACTER RECOGNITION

BACKGROUND OF THE INVENTION

This invention is in the field of optical character recognition (OCR).

This application is related to the following co-pending applications: Ser. No. 115,986, filed Jan. 28, 1980, inventor, Warner C. Scott; Ser. No. 153,342, filed May 27, 1980, inventor, Warner C. Scott; Ser. No. 501,037, filed Aug. 1, 1983, inventor, Warner C. Scott. The following applications are filed concurrently herewith: Ser. No. 527,152, filed Aug. 26, 1983, Ser. No. 527,151, filed Aug. 26, 1983, now abandoned; Ser. No. 527,155, filed Aug. 26, 1983; Ser. No. 527,731, filed Aug. 26, 1983; Ser. No. 527,153, filed Aug. 26, 1983; Ser. No. 527,150, filed Aug. 26, 1983.

Appendix 5, available on microfiche, is the complete source code listing for the microprocessor 90. This source code listing completely defines the entire function of the microprocessor 90 and can be used to produce the object code. Appendix 6, available on microfiche, is the complete source code listing for the microprocessor 148. This microfiche appendix is on two separate fiche having a total of 170 frames. The table of contents is in the last frame of the last fiche in the lower right corner.

OCR devices currently on the market have numerous disadvantages. They are very expensive, between $7,000 and $100,000, and use a large amount of electronic hardware. Many also use time consuming character matching techniques. An article titled "Machines That Read Move Up a Grade" by Herb Brody in High Technology, February 1983 pp. 35-40 discusses OCR devices.

Section 4 and Appendix D of the User's Manual for the TMS 9995, Copyright, 1981, are hereby incorporated by reference. Specifically, pages 4-1 through 4-24, and D-1 through D-5 of the book entitled AMPL, TMAM 6095 Evaluation Module for TMS 9995 Microprocessor, Microprocessor Series, User's Manual, copyright by Texas Instruments 1981 are hereby incorporated by reference. The data sheet to Type TC101, 1728 X 1 CCD Linear Image Sensor dated February, 1982, publication D2663, published by Texas instruments, pages 1-11 is hereby incorporated by reference.

It is an object of this invention to provide an OCR system which has high speed and accuracy.

It is an object of this invention to provide a method of testing only that data representative of the periphery of a character stored in a random access memory (RAM).

It is a further object to provide a method of reading data representative of a test character in a sequence which circumnavigates the test character.

It is a further object of this invention to provide numerous parameters of a test character for comparison with parameters of reference characters for OCR.

SUMMARY OF THE INVENTION

Disclosed is an apparatus and method for reading printed text using light sensitive scanners and inputting the scanned page into a buffer memory. The buffer memory is accessed by a microprocessor system which analyzes the stored data and a microprocessor system which analyzes the stored data and outputs an ASCII code for each character on the page. Thus, a typed page can be inputted to a word processing or other computer storage systems without the need for manual typing.

A method for scanning a page and locating individual characters on that page so that character recognition can be performed is disclosed. A page containing characters to be read is scanned with successive scan lines from top to bottom and the data contained in each scan line is transmitted to a buffer memory for temporary storage. An additional set of data which represents the significant amount of character information within a scan line is also generated and stored in a separate memory. When the microprocessor is ready to begin recognizing characters the set of data which indicates those scan lines containing significant character data is accessed and read. The microprocessor then accesses a different set of data which represents the significant character information as arranged in vertical pixel lines. When the microprocessor locates a vertical pixel line having significant character information the microprocessor then begins reading data from the buffer memory at locations as determined by the external data sets. The microprocessor does not read data in the buffer memory unless it corresponds to areas in which significant character data is located. The microprocessor is able to quickly scan an entire page and locate all characters within the page to provide for fast optical character recognition.

The method as claimed in this application is particularly directed towards a method of fast access to individual characters as stored in a memory location. The microprocessor does not begin to read character data from the stored location until the external data sets have been read to determine the address locations of significant character data. After the address locations of significant character data have been defined the microprocessor begins at the center pixel line between the left and right pixel line which define a character and at the lower most scan line which defines a text line and begins reading the character data from the pixel buffer for the first time. The microprocessor then steps around the character in a sequence which circumnavigates the character. During the circumnavigation many data points which correspond to character information are not addressed and not read. The microprocessor reads only those few character data points which surround the periphery of the character and does not read data from the interior of the character even though it may contain significant character data.

The claimed method is particularly useful in high speed location of text lines of horizontal characters arranged across the page and high speed location of individual characters within the text line.

After the microprocessor has located the character using the method of this invention then other methods may be used to recognize the character. The methods which are used to recognize the character are fully described and claimed in commonly assigned and concurrently filed applications.

BRIEF DESCRIPTION OF THE DRAWINGS

FIGS. 3a-f are detailed circuit diagrams as shown in FIG. 1.

FIGS. 4a-d are circuit diagrams for another part of the invention as shown in FIG. 1.

FIGS. 8a-d are flow charts of the method of this invention.

FIGS. 9a-9f show an example of generating a series of contour numbers.

A detailed description of the invention is now given describing particular embodiments, including circuits and methods of operation. Many of the embodiments are expressed in the alternative because each may be advantageous in different uses or situations. It is to be understood that each embodiment has advantages which others may not offer in particular situations.

The hardware of this invention was designed with adaptability in mind. This is one of the advantages of the circuit of this invention. This means that many different methods of character recognition could be performed with this or very similar circuit configurations. For example, the circuit design allows the characters recognition using height, area, perimeters, and width, or digital waveform, or calipers, or programmable penetrators or any combination thereof without changing the circuit or hardware wiring in any way. This is a considerable advantage over many prior art devices whose use is directly related to the hardware circuit. The hardware circuit described herein is particularly software adaptable. For example, this circuit could likely be used to perform matrix matching techniques for OCR though they are not described herein. The circuit's universal usefulness for many methods of performing OCR is particularly important.

DESCRIPTION OF THE PREFERRED EMBODIMENT

Apparatus for OCR

Figure 1:
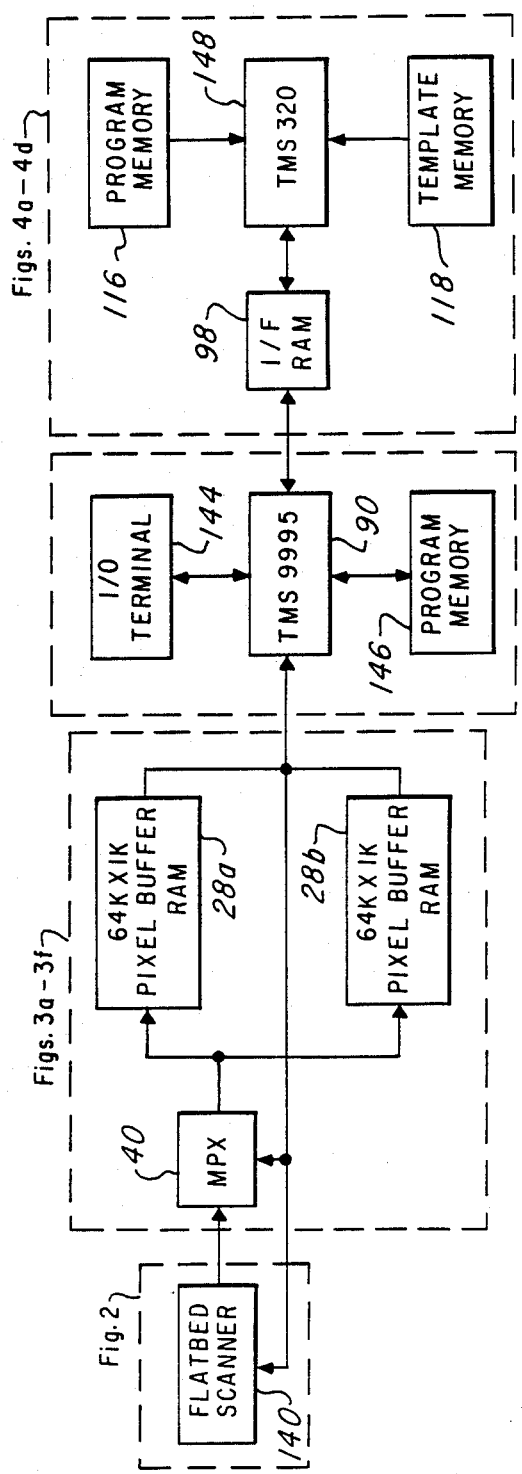
FIG. 1 is a block diagram of the circuit.

FIG. 1 is a block diagram illustrating an apparatus for optical character recognition. A flatbed scanner 140 is directly connected to pixel buffers 28A and 28B through a multiplexer 40. The pixel buffer RAMS 28A and 28B are connected to a microprocessor 90 which in this embodiment is a TMS9995. The microprocessor 90 is connected to a terminal 144 and program memory 146. The microprocessor 90 is also connected to a second microprocessor 148 through an interface 98. The second microprocessor 148 in this embodiment is a TMS320 and is connected to program memory 116 and template memory 118. FIG. 1 is shown in greater detail in FIGS. 2, 3a-3f, and 4a-4d as shown on FIG. 1.

The apparatus of FIG. 1 operates as follows. Data from the flatbed scanner is digitized and then sent to either pixel buffer RAMS 28A or 28B as selected by multiplexer 40. The microprocessor 90 then accesses the RAM containing the information and while the microprocessor 90 is reading from one pixel buffer the multiplexer will select the other pixel buffer for writing so that the writing and reading can be simultaneous with each other. The multiplexer operates with the microprocessor 90 so as to alternate writing into one pixel buffer while the microprocessor 90 is reading from the other pixel buffer at all times. The microprocessor 90 can be controlled through the terminal 144 and can have program memory steps changed by terminal 144 interfacing with the program memory. The microprocessor 90 computes the desired parameters which might include the height, width, perimeter, area within the periphery, waveform and etc. of the test character as controlled by the program. After all of the desired information has been extracted from the character in the pixel buffer the microprocessor 90 loads the interface RAM 98 with the parameters and signals the microprocessor 148 to begin its program on the data. The microprocessor 148 receives the parameter data of the test character from the interface 98 and performs certain functions as dictated by the program. The microprocessor 148 may store the data for later use as a reference character, it may store it for comparison with other reference characters to alter the template memory, or it may compare the test character with reference characters previously stored in template memory to provide a match and an output. If the program is such that the test character has been matched with a reference character in the template memory 118 the microprocessor 148 sends the ASCII code for that character back into the interface 98 and signals the microprocessor 90 that a result of the comparison has been loaded into the interface. While the microprocessor 148 was comparing the data from a test character to provide an output, the microprocessor 90 was computing the desired parameters, such as height, width, perimeter and etc. of the next test character. The microprocessor 90 completes the next character and transfers that data into the interface memory and then retrieves the ASCII code for the character just tested. Thus, the microprocessor 90 controls the timing and transfer of data for all parts of the system including, the flatbed scanner, the multiplexer 40, the sending of information by the interface 98 and pixel buffers. When the microprocessor 90 receives the ASCII code for the character from the interface 98 it matches that character with its location on the text line being scanned and sends it to a terminal buffer for it to be arranged according to its proper location with all other characters in the line as they are read and identified. After the first text line has been scanned by the microprocessor 90 the flatbed scanner continues bringing data into the multiplexer and the next text line is read following the same steps. This process is continued until the entire page is read.

The apparatus and operation of the circuit will now be described with considerable detail as shown in FIGS. 2, 3a-3f, and 4a-4d.

Figure 2:
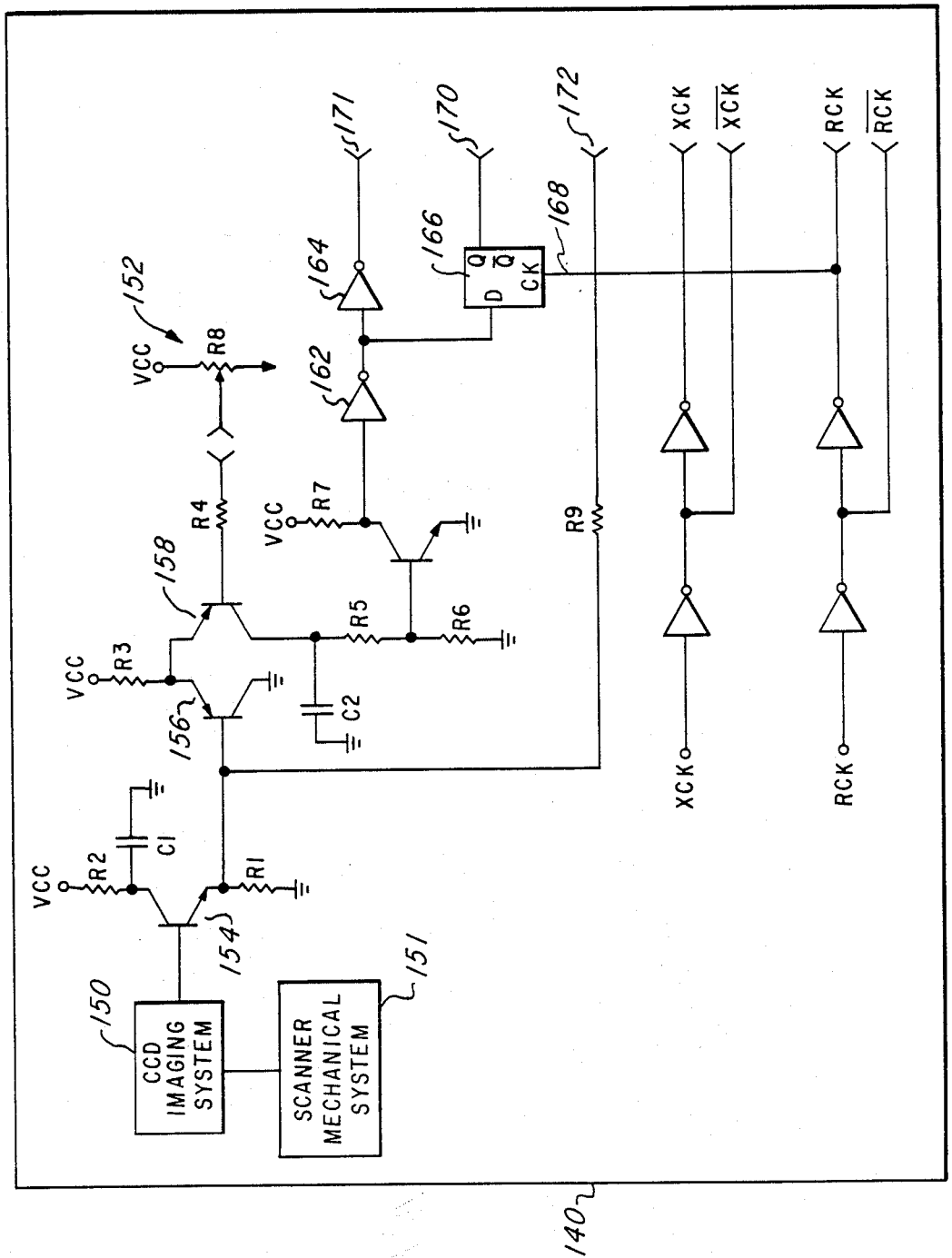
FIG. 2 shows the CCD imaging system within the flatbed scanner.

The flatbed scanner 140 is constructed using known techniques having a system of lights and mirrors so that characters printed on a page which is placed on the flatbed scanner are scanned by the light and their images are presented to the CCD array and imaging system 150. The CCD imaging system may be of the type TC101, a 1728×1 CCD linear image sensor as sold by Texas Instruments and described in considerable detail in the accompaning specification which is attached as Appendix I and is hereby incorporated by reference. The output of the CCD imaging system 150 is converted into binary data by the circuit 152 having the components and structure as shown in FIG. 2. The circuit 152 is comprised of a transistor 154 having resistors and a capacitor connected at the appropriate locations as shown. The transistor 154 is connected to transistors 156 and 158 which feed through a resistor R5 which is connected to a transistor 160. Transistor 160 is connected through inverters 162 and 164 to provide an output. The output of 162 is fed to D flip-flop 166 which provides the binary code which represents the images which have been scanned by the CCD imaging system 150. The D flip-flop 166 is also connected to line 168 coming from the RCK as shown. The circuit also provides the analog output 172 which can be used if desired. Circuit 152 also shows parts of the CCD imaging system 150 such as the connections from clocks, XCK and XCK inverted, RCK and RCK inverted. Transistor 158 is also shown connected to a potentiometer R8 in an outside circuit. Values for the resistors which have been used in the system are as follows: R1=1K, R2=0.05K, R3=2.7K, R4=0.47K, R5=2.2K, R6=1K, R8=10K, potentiometer, R9=0.1K. The output of circuit 152 is provided from the flatbed scanner as the data which is fed to the pixel buffers on line 20 and controlled by the multiplexer 40 as shown in FIGS. 3a-3f.

Figure 3A:
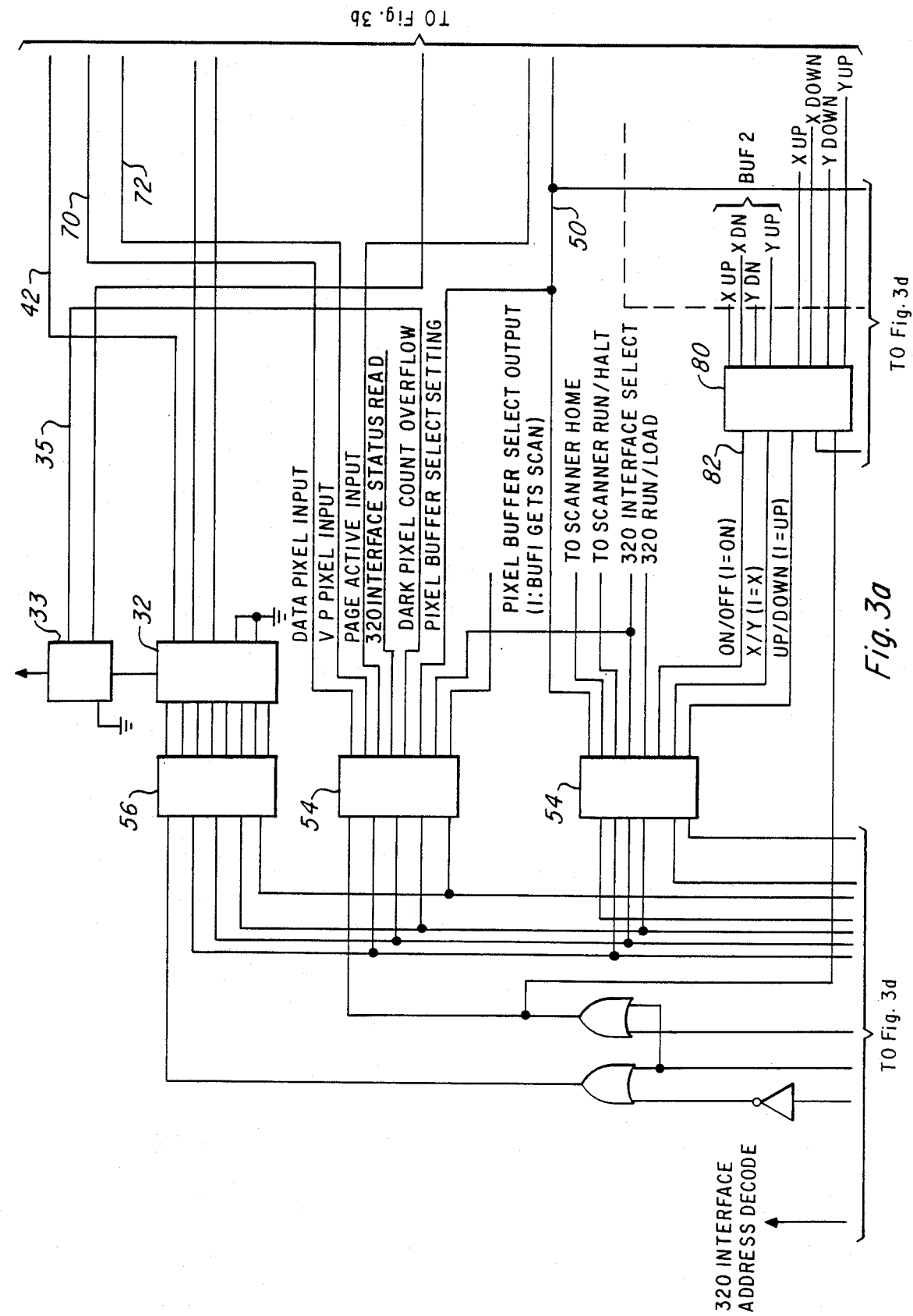
Figure 3D:
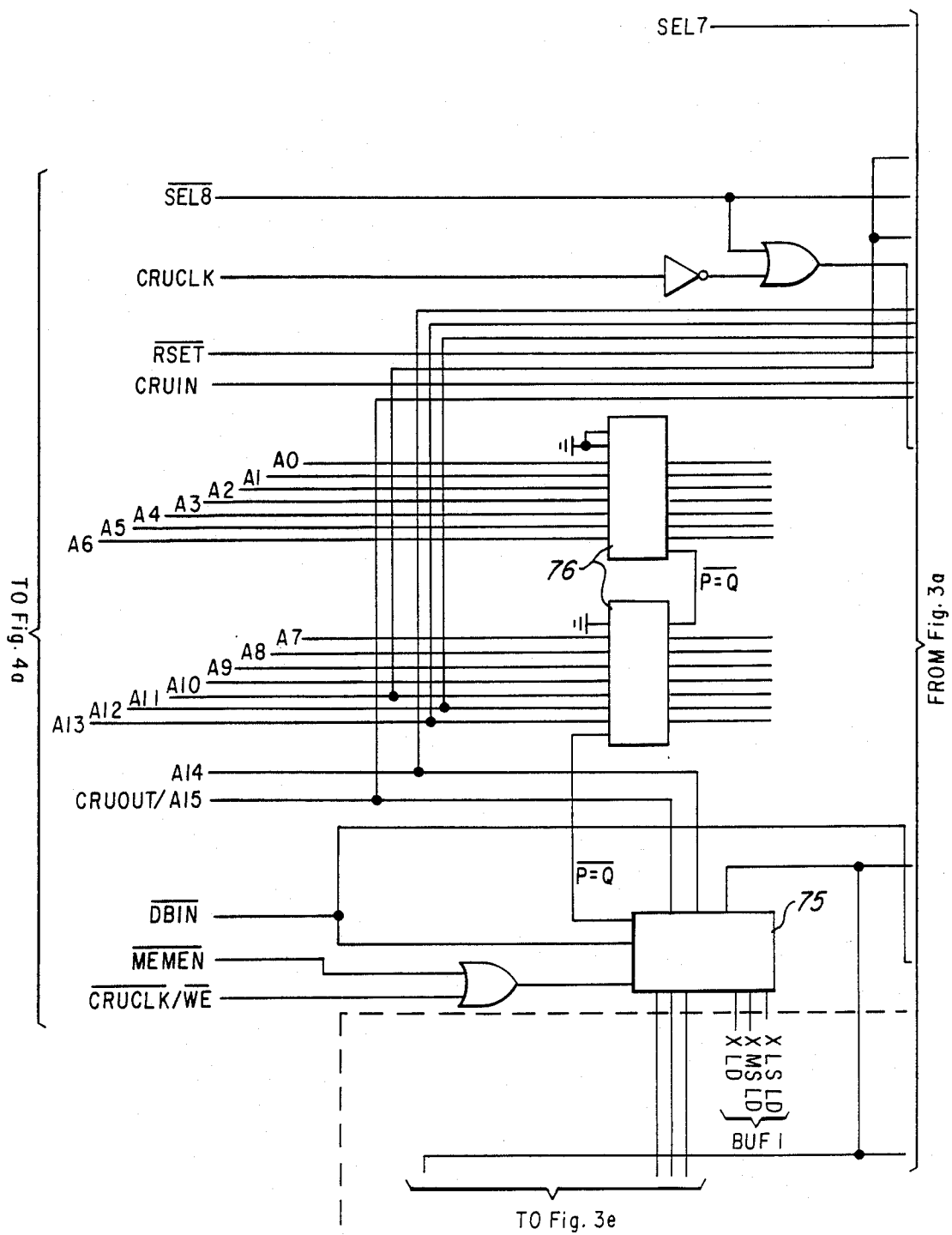

FIGS. 3a14 f show the detail circuit corresponding to that portion marked FIGS. 3a-f on FIG. 1. It should also be noted that two of every item shown within the dotted lines is provided. For example, only one pixel buffer with address registers is shown, however, there is an identical second pixel buffer provided with respective address registers and connections to the multiplexer 40 as shown by the dotted line surrounding these parts. The connection of duplicate identical pixel buffers to the appropriate address registers and multiplexer 40 is completely shown by this set of drawings FIGS. 3a-f so that the circuit could be built by one of ordinary skill in the art.

The circuit connections and operations of FIGS. 3a-f will now be described. The clock from the scanner on line 22 is connected to D flip flop 24 so that when the clock goes high, data is supplied on line 26 to either pixel buffer 28A or 28B depending upon which pixel buffer has been selected by the multiplexer 40. A series of three X address registers 38A, 38B and 38C are connected to the pixel buffer and are automatically incremented as data is written into the pixel buffer. That is, the writing in of data into the pixel buffer automatically increments the X address so that data may be written continuously into the pixel buffer thus saving considerable time in addressing individual X locations as data is written into the pixel buffer. Vertical projection RAM 30 is a binary register which is high if there are any pixels in the vertical line, that is, the X columns, in the pixel buffer. If even one black pixel is fed into the X column then the vertical projection is one. Horizontal projection counter 32 is incremented each time a black pixel is written into a scan line of the buffer 28A by the clock pulse on line 42 coming out of the multiplexer 40. The multiplexer 40 increments the clock on line 42 only when a black pixel is written into the pixel buffer so that horizontal projection counter 32 indicates the exact number of black pixels in that row.

Horizontal projection counter 32 has an overflow D flip-flop 33 which is set if the black pixel count representing the horizontal projection in 32 is overrun, that is if the horizontal projection is over 256 pixels per line for this particular counter 32. The D flip-flop 33 sends an output to I/O register 54 on line 35 to indicate black pixel count overflow. Registers 52, 54 and 56 are bit I/O communicating register units (CRU) which provide the connection for signals to the microprocessor 90. At the end of each scan line scan active 34 goes low which is interfaced with an interrupt circuit 36 which causes the microprocessor 90 to run an interrupt service routine which reads the value of counter 32. As part of the interrupt service routine the microprocessor 90 also increments the Y address of 28A so that the next scan line will be fed into the next row of 28A. The RAM 30 is used to store the vertical projection. The vertical projection is low if any pixel in a column is black. EPROM 44 acts as a white-out for the horizontal projection through NAND gate 46 to prevent 32 from being incremented for a predetermined first and last number of pixels during the write-in. Similarly, PROM 48 does a white-out function on the vertical projection while the data is being written into the buffer 28A for scan lines zero and 63. The pixels at either edge of each scan line do not contain data corresponding to a character being read because they are at the very edges of the paper and may also correspond to images which are just off of the edge of the paper. The number of pixels which EPROM 44 and PROM 48 white-out can be varied depending on the application and the sensitivity of the machine. Writing into the first pixel buffer 28A continues until a text line is isolated. When microprocessor 90 senses that the first pixel buffer has an isolated text line it sends a signal through I/O 52 on line 50 to the multiplexer 40 to select the next pixel buffer 28B for writing into. Line 50 also feeds through NAND gates 60 and 62 and inverter 58 so that all other parts of the circuit are appropriately switched to feed data into the other pixel buffer and to control its functions. The duplicate portions of the pixel buffer and necessary address registers are shown by the dotted lines in FIGS. 3a-f.

The microprocessor 90 is now ready to begin reading out of the first pixel buffer while the second pixel buffer 28B is being written in. As the microprocessor 90 begins to read out of the pixel buffer it does so through 40 interfacing with the correct pixel buffer along line 70 through I/O register 54. During the read out from the pixel buffer EPROM 44 and PROM 48 white-out the same pixels on the borders as those which were whited-out during the write-in sequence. Loadable comparater 64 compares the current Y address with the previous Y addresses which have been read as indicated by zero horizontal projection and latches the Y address into comparater 64. Comparater 64 then acts as a white-out for unused scan lines at the end of the pixel buffer. A text line is completely scanned until the horizontal projection on that text line is zero and then the microprocessor 90 selects the next buffer line by sending a signal down line 50 through I/O register 52 to begin reading the next row of data. Data is fed through 40, line 70, I/O 54 and through 54 to the microprocessor 90. The vertical projection is fed along line 72 for each pixel buffer line. During the read-out sequence X and Y registers 38 and 37 provide access to individuals pixels within the pixel buffer.

X and Y pixel address registers were specifically designed to read-out individual pixels from particular X and Y locations one bit at a time rather than having to read one byte. This important feature allows the microprocessor 90 to test individual bits. They also allow the pixel buffer to be addressed to any X and Y from any prior X and Y location in the pixel buffer very quickly. This is an important feature of one embodiment of the current invention. As shown in FIGS. 8-10 and in the accompanying description, the test from one pixel to the next could be any one of eight locations surrounding that pixel depending upon the compass bearing. The X and Y registers allow any location to be addressed in any sequence and thus is a tremendous aid in circumnavigating the test character. For example, the next pixel to be tested may require incrementing either the X or the Y registers or incrementing both registers at the same time. In addition, the test from one cell to the next may require decrementing either the X or the Y and simultaneously incrementing the other register. Additionally when calipers are being determined the microprocessors required to access an X and Y location which are not related to the prior X and Y location just addressed. Pixel buffers designed so that access to any particular datapoint is much faster than would normally be possible with the pixels being stored in the microprocessor memory space.

Figure 3E:
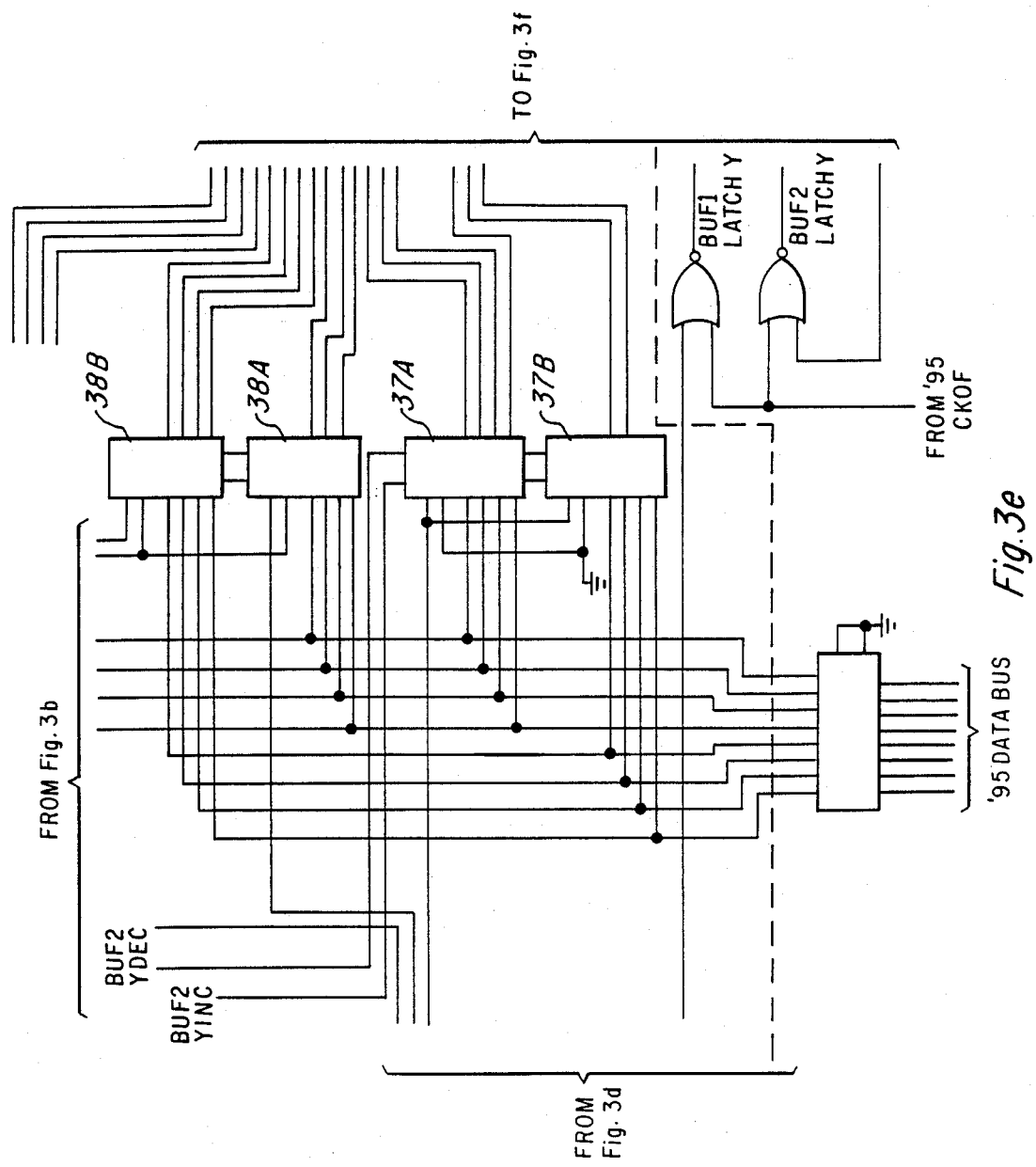
Figure 3F:
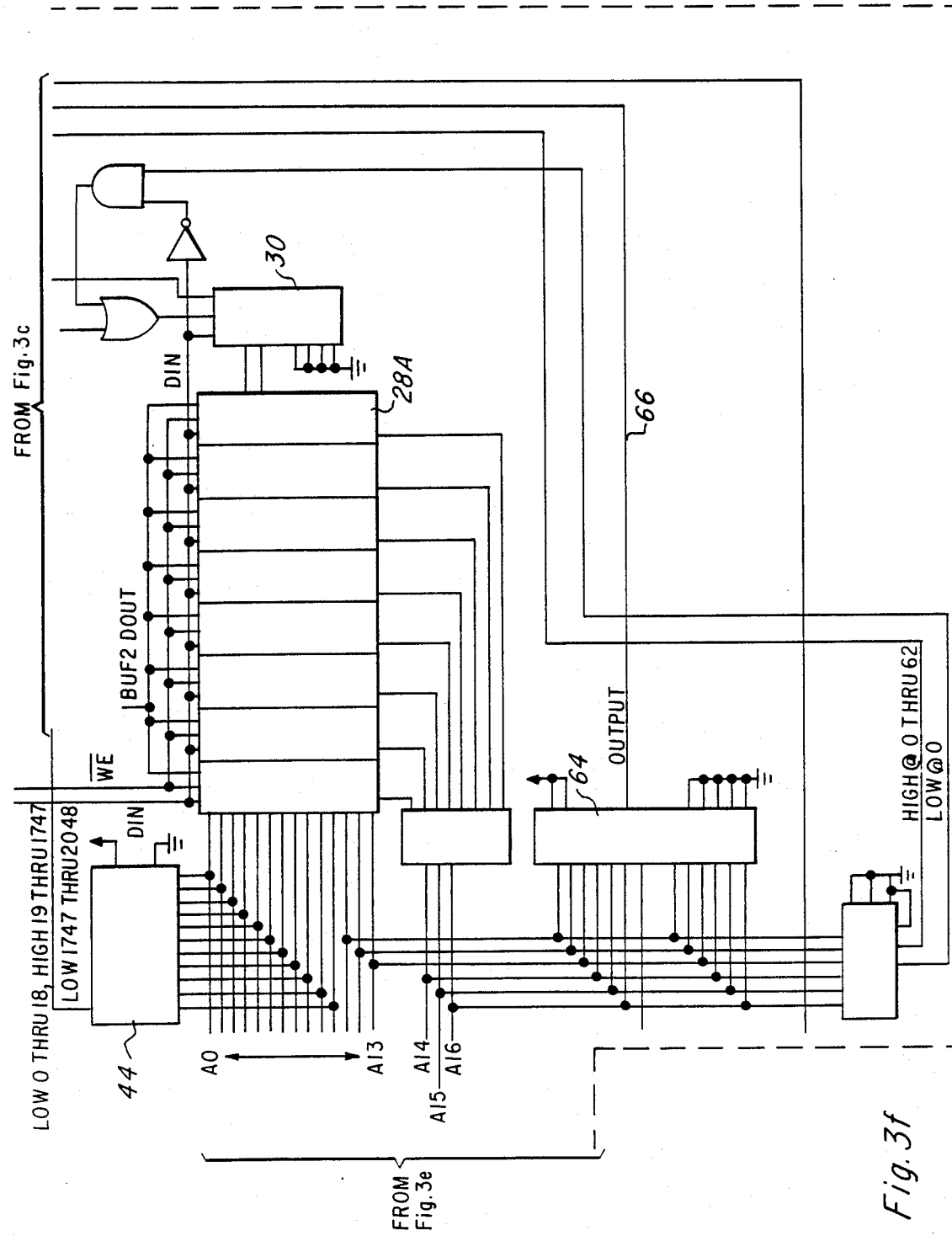
Figure 4B:
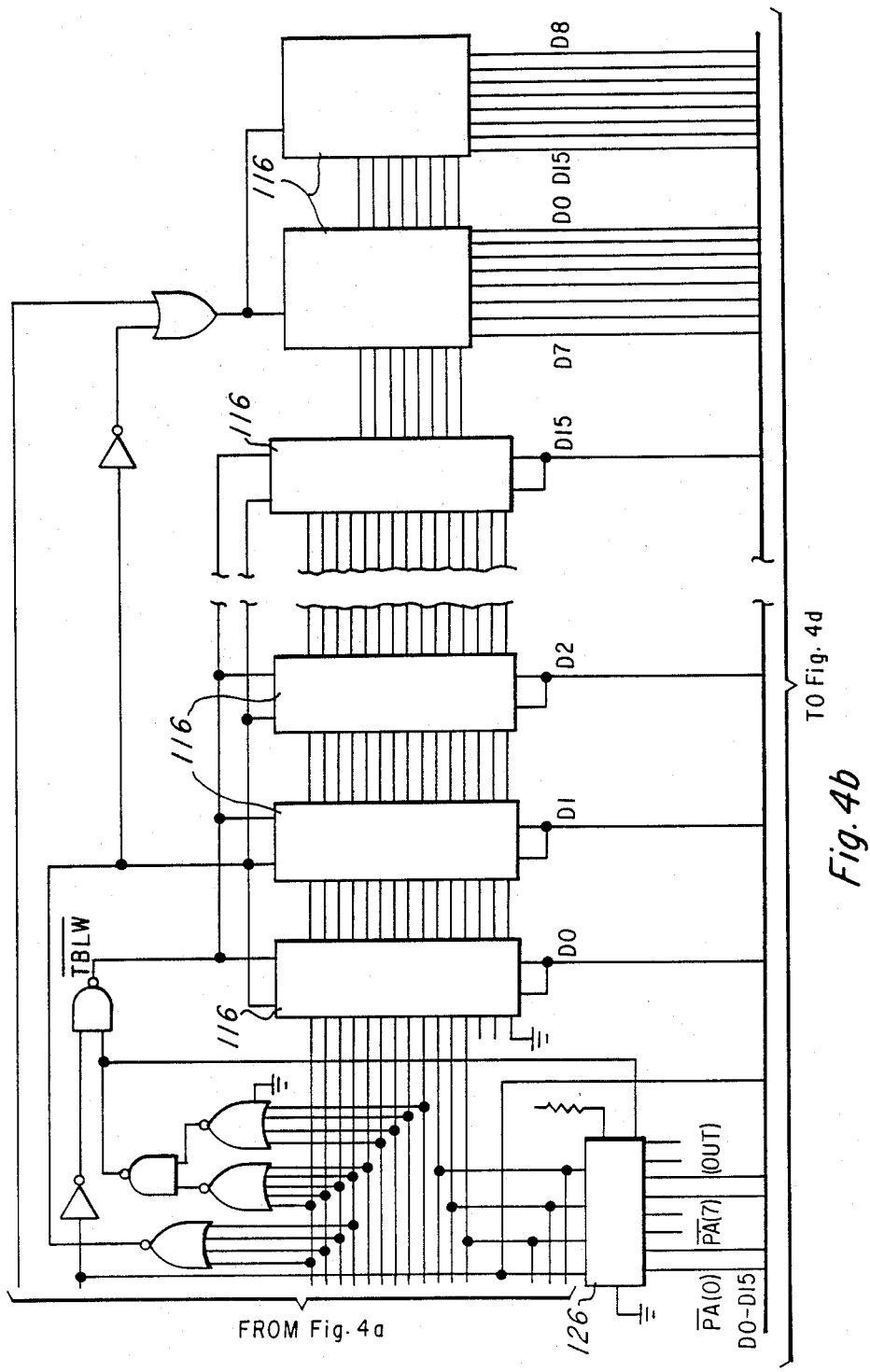
Figure 4C:
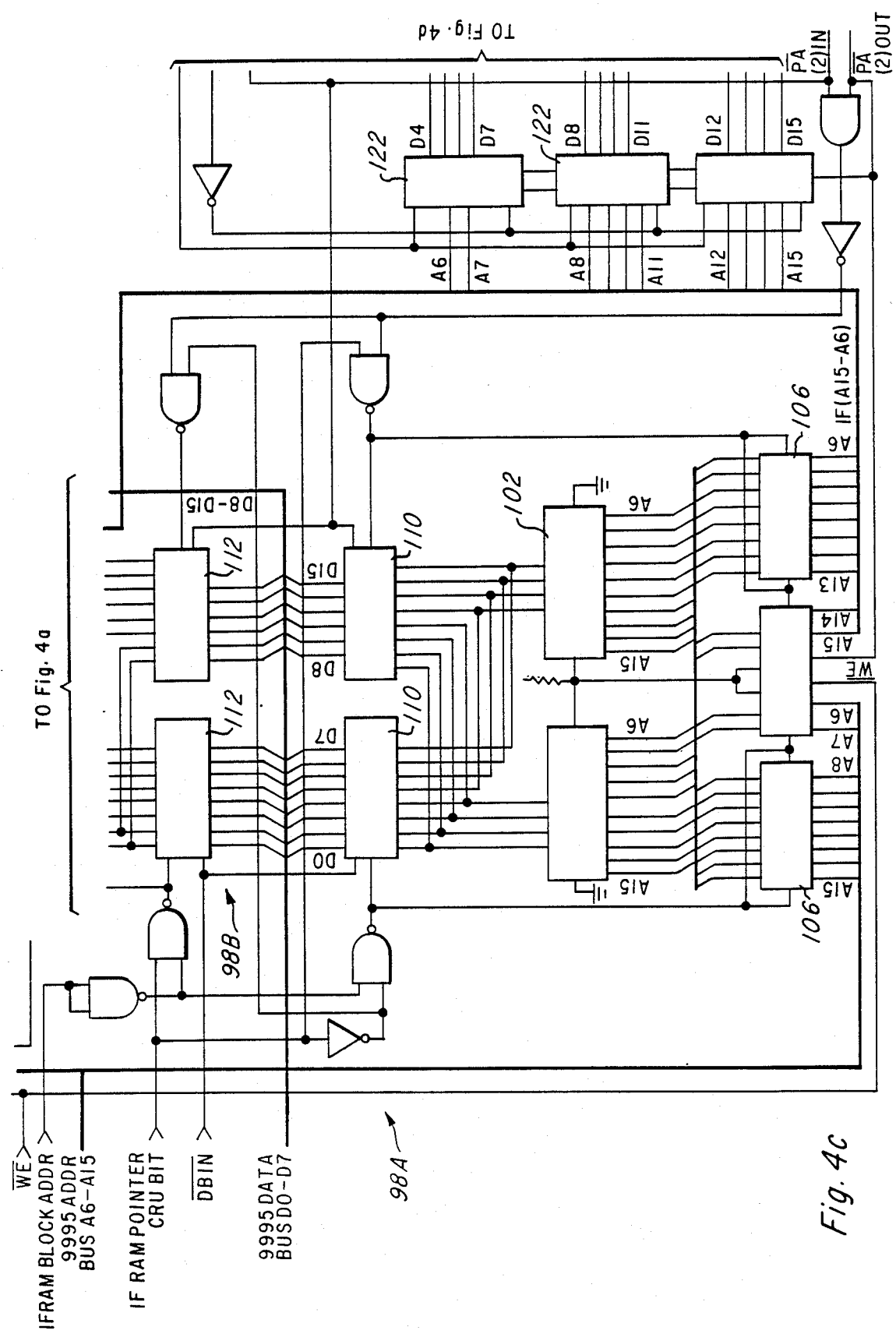
Figure 4D:
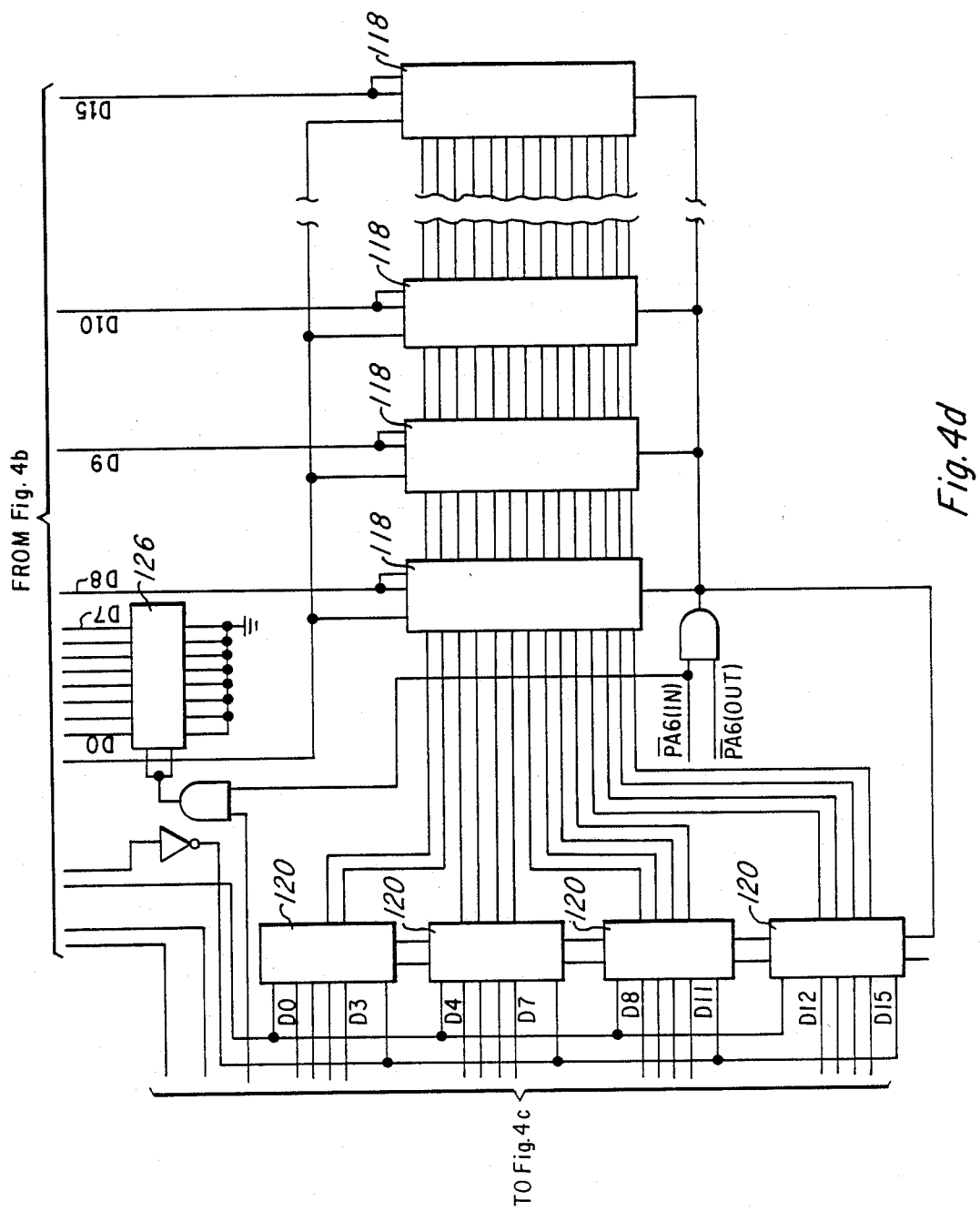

The X and Y address registers work as follows. The microprocessor 90 controls the modifying of these registers through external workspace registers R0 for X and R1 for Y which can be modified following commands and results of prior tests to a particular cell as explained hereafter. The X and Y location of the current reference cell is stored in RAM 74 located within the program memory 146. When the microprocessor is ready to read another pixel it modifies either or both R0 or R1 to address the desired X and Y location. This location is written into access registers 37 and 38 to locate the particular address of the cell in the pixel buffer and provides the output of that location on line 70, whether it be high or low. Access registers 37 and 38 are loadable counters. This allows the microprocessor 90 to load the desired address which corresponds to the address registers in X and Y coordinates into the registers 37 and 38 for individual X and Y accessing. The pixel buffers 28A and 28B are comprised of eight 16K×1K RAMS. The RAMS are all interconnected to each other so that decoder 39 can select any particular RAM for access as directed by Y address register 37. This would allow access to the selected RAM through common input lines as used by address registers 38A–C. As shown in FIG. 3e three of the data lines from the Y address register 37 are fed into the address of the RAMS as the three most significant bits in determining the address. Eleven address lines for the X address register are fed in as the eleven least significant bits in determining the address location. An incrementing of the Y address register by one is equivalent to starting a new row so that the eleven least significant digits of the X address register can begin to address new data locations starting at zero and going in sequence for each incrementing of the Y address register. When the Y address register has been incremented so that the three least significan bits of the Y address register are one then an incrementing would select the next RAM for addressing the data buffers. The least three significant digits of the Y address register are connected to provide the three most significant digits in the RAM address as shown in FIGS. 3e and 3f.

This particular design of the RAM is particularly suited for the pixel imager which has been used with this invention to provide adequate rows for each scan line which is provided. The CCD imager provides 1728 pixels for each scan line which correspond on a one to one correspondence to a row of X locations in the pixel buffers. A total of 2048 X address locations are provided in each row so that an adequate number of address locations are always provided for the data in each row of a scan line. The Y address register is then incremented once for the next scan line so that one entire scan line can be placed on each succeeded row of pixels as read for the imager. It is to be understood that any desired CCD imager could be used in this invention. In some cases it may be desirable to use a CCD imager with considerably more resolution having many more pixels per scan line to provide more data points. It may also be desirable to use different types of imagers or even a magnetic pick up as the scanner/imager is desired. The circuit configuration as shown in FIGS. 3e and f is a novel hardware configuration which allows easy access to any X address with or without incrementing the Y and conversely access to any Y address with or without incrementing the X. Additionally, the access speed is not made slower if both X and Y addresses must be changed due to the hardware configuration of the circuit. This results in a distinct advantage in performing the circumnavigation as described in this invention.

The microprocessor 90 may return to the RAM in 146 to read the current reference location X and Y if necessary during certain steps of the testing. Registers 76 are the address decoders for pixel address registers 37 and 38 and are connected to the microprocessor 90. Decoder 80 can clock either up or down the X or Y during the read-out if desired. Decoder 80 can be turned on to auto increment either the X or the Y location on lines 82 from I/O register 52 if desired. During this mode the read-out is much faster and when the auto increment 82 is used the microprocessor 90 is in the mode to read, read, read and continue reading each pixel without having to increment different registers.

Pulse synchronizer 84 prevents false writing of the vertical projection RAM 30 by synchronizing its clock with all other clocks.

Looking now particularly at FIG. 1 which shows the microprocessor 90, which in this embodiment is a TSM9995 manufactured by Texas Instruments in the 9900 series. Any other suitable microprocessor could be used. Documentation for the TMS9995 is attached as an Appendix I hereto and is incorporated by reference. The microprocessor 90 controls the circumnavigation, the scanner, the pixel buffers, and other parts of the circuit. The microprocessor 90 includes the various decoders, address registers, RAMs, output terminals, and other parts as shown in Appendix II. These various circuit parts are represented by the box 90 and referred to collectively as the microprocessor 90 and supporting circuits.

Microprocessor 90 circumnavigates the entire test character in the pixel buffer and extracts the desired parameters, such as, height, width, perimeter, area within the periphery, the waveform and the maximum and minimum X at each Y and the maximum and minimum Y at each X, depending on the particular program mode of the microprocessor 90. The microprocessor 148 does no comparison on the parameters until they have all been extracted by the microprocessor 90. Once the letter has been completely circumnavigated and all the parameters determined the microprocessor 90 is ready to transfer the data to microprocessor 148 for storage as a reference character or for comparison with reference characters. Microprocessor 90 selects one of two interface registers either 98A or 98B for transmitting the data to the microprocessor 148. The interface registers 98A and 98B are identical and could perform each others functions. Interface registers are used to transmit data to the microprocessor 148 from the microprocessor 90 and to transmit data back to the microprocessor 90 from the microprocessor 148. Each of the interfaces have RAMs 102 and 104, address buffers 106 and 108 and data buffers 110 and 112. The selection of which interface register to use is determined by the microprocessor 90 on output bit from I/O 52. Flip-flop 114 is set when the features are ready for the microprocessor 148 to compare. The microprocessor 148 is a TMS320 which is manufactured by Texas Instruments.

The microprocessor 148 uses program memory RAMs and ROMs 116. The template memory containing the reference characters for comparison is loaded into RAM 118. RAM 118 is addressed by the microprocessor 148 through loadable automatic incrementing address register 120. Loadable automatic increment register 122 is used to address the interface registers 98A and 98B. Microprocessor 148 has I/O select signal generation circuits 124 and 126. Data buffering to the microprocessor 148 is done by buffers 128 and 130. Data is read out of the microprocessor 90 normally in eight-bit bytes and the microprocessor 148 in this embodiment uses 16-bit words therefore a zero-out register 132 is connected to the microprocessor 148 to make sure that the other eight bits of its 16-bit word are zeroed and that the other eight bits correspond to the bits from the microprocessor 90.

The microprocessor 148 receives the character parameter data from the interface unit and loads the data into the appropriate location for comparison with reference character's parameters. The microprocessor 148 then selects a first character parameter and goes to the template memory to select a reference character and compares the corresponding parameter of the reference character to the corresponding parameter of that character which is being tested. The microprocessor 148 continues the comparison of character parameters to reference character parameters as dictated by the program memory as explained hereafter. The microprocessor 148 continues to select reference characters from the template memory until the program indicates that a match has been found for that particular character. The microprocessor 148 then provides the ASCII code for that character from its template memory and places that ASCII code in the interface register 98 for transmission back to the microprocessor 90. The ASCII code for that character will remain in the interface 98 until the microprocessor 90 is ready to retrieve that ASCII code and provide it to the output buffer. The microprocessor 148 signals the microprocessor 90 as soon as the ASCII code for the reference character has been placed in the interface 98 and waits for new test character parameters to be placed in the interface unit so that the next character can be compared and the correct reference character selected. The microprocessor 90 retrieves the ASCII code for the recognized character at the same time that it provides new character parameters for testing to the interface unit or transferred to the microprocessor 148.

In an alternative embodiment the microprocessor 148 can be programmed to provide its own template memory and store parameters for reference characters. In this mode the character parameters are transferred to the microprocessor 148 with the ASCII code representing the character for which the parameters are a match. The microprocessor 148 then places these parameters in its template memory as dictated by the program which allows the microprocessor 148 to be taught new reference characters which are not presently contained in its template memory. This feature would allow an operator to provide an entirely new template memory with new reference characters to perform optical character recognition on characters which were not presently stored in the template memory.

The microprocessor 90 retrieves the ASCII code for the character which has just been recognized from the interface unit 98 and places that ASCII code in an output buffer for the text line in which that character appeared. The entire text line of characters is arranged in the output buffer before the contents of the buffer are provided as an output. The microprocessor 90 also determines the correct spacing between characters by looking at the number of pixels between each character and places the appropriate spacing in the output buffer. In this embodiment the microprocessor 90 begins from left to right and arranges the characters in the order in which they were received from the microprocessor 148 because the microprocessor 90 was dictated by its program memory to begin providing parameters for characters from left to right starting with the first in the text line. After the microprocessor 90 has sent parameters for each character in the text line and received the ASCII code for corresponding reference character whose parameters match the test character's parameters from the microprocessor 148 the entire output buffer is loaded with one full text line. The microprocessor 90 then performs final spacing and character recognition tests using context rules as dictated by the program memory. Some of these steps are performed as the recognized character is fed into the output buffer. For example, when an apostrophe is received as the matching character the microprocessor 90 reads the adjacent character in the output buffer to determine if it is also an apostrophe. If two apostrophies are found next to each other and separated by less than a threshold value for a space the microprocessor 90 will place the ASCII code for a quotation mark in place of the ASCII code for each of the two apostrophies. The microprocessor 90 may perform similar context tests with other characters as dictated by the program memory as explained hereafter. When the entire text line in the output buffer has been properly arranged the microprocessor 90 outputs the text line through the I/O terminal to any desired output device to which it may be connected. The microprocessor 90 then goes to the pixel buffer to begin reading the next text line beginning at the first character in the line as dictated by the program memory and continues reading text lines and providing them as outputs through the output buffer until each character on the page has been recognized and provided as an output.

Method of Operation

The method of recognizing a character will now be described with reference to FIGS. 8a-8d.

Text Line and Character Isolation

Figure 8A:
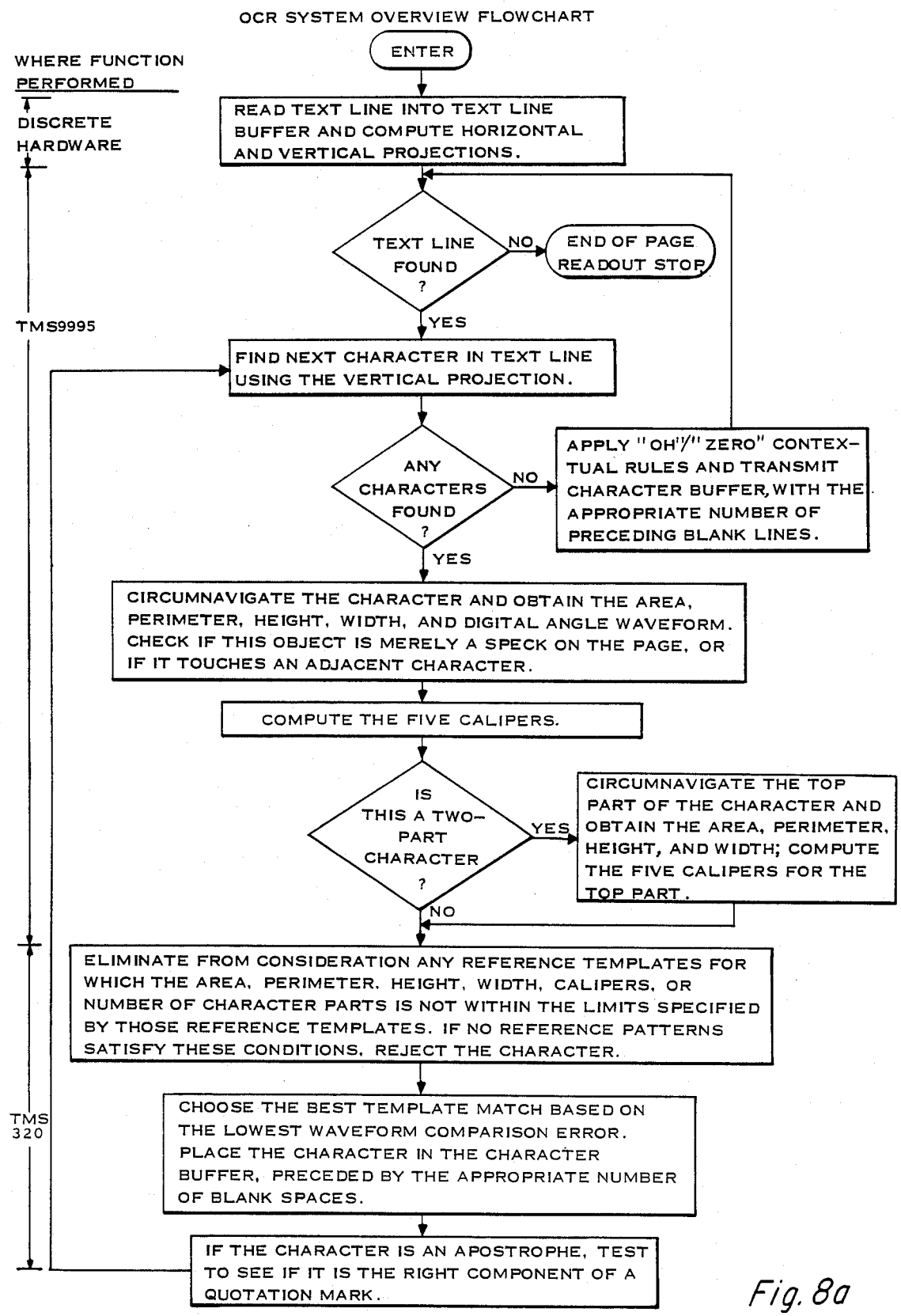

FIG. 8a is a flowchart of the method of operation of the character recognition apparatus of this invention. This flow chart is one particular embodiment which has been used in tests and has been found satisfactory in performing recognition of characters. It is to be understood that various parts of the flow chart could be altered if different parameters are going to be used to test characters or if the parameters will be compared in a different sequence. For example, in one embodiment the five calipers may not be computed and not used in the reference character comparison step. In an alternative embodiment the digital waveform may not be computed but be replaced by the programmable penetrators or a series of calipers, for example, 36 caliper numbers. The flow chart could also be altered to show the extraction of parameters from characters for use as reference characters as stored in the template memory.

The operation of the invention as shown in the flow chart will now be described with particular detail. The flow chart of FIG. 8a shows the isolation of text lines, character isolation within a text line, extraction of parameters from the character, transfer of that set of parameters to the microprocessor 148, return of the ASCII code for the character which matches the character which has been tested to the microprocessor 90 which places the character in the output buffer and performs the context rules to determine that each character has been properly identified prior to providing the text line as an output through the output buffer to the terminal.

FIG. 8a shows the microprocessor beginning the scan of the page when it enters the flow chart of the overall system. The microprocessor 90 controls the speed at which the scanner moves down the page and which pixel buffer is fed the data from the scanner. The microprocessor 90 controls all parts of the circuit in one form or another and acts as the central processing unit for the circuit. As the scan line from the page which has been scanned is fed into the pixel buffer one scan line represents the entire line across a thin horizontal section of the page. X increases from left to right. This same X coordinate is used for addresses in the pixel buffer so that the X address in the pixel buffer will correspond and indicate the X location of any one pixel within that scan line on the paper. Each scan line is given a Y value. Y increases from the top of the page to the bottom which is opposite from the standard notation for Y. Therefore, there will never be a negative Y, rather Y0 will be the first scan line on the page and Y will increase in scan lines down through the bottom of the page. The color of the character is referred to as black and is given a value of one. The background color is referred to as white and is given a value of zero.

The dimensions of the CCD imager with respect to the page and the character is such that an average character would be approximately 15–30 pixels high and approximately 10–22 pixels wide. Each pixel of the character being read is given a single corresponding X and Y address location in the pixel buffer. There will be an identical and corresponding number of ones stored in the pixel buffer with the exact location as there are black pixels on the page which is being read. The result is that the microprocessor can determine the number of ones within the pixel buffer and this will exactly correspond to the number of black pixels and their location on the character which has been read. Similarly, the microprocessor can test the values of address locations which represent only pixels on the periphery of the character by circumnavigating those address locations within the pixel buffer. This is identical to circumnavigating the character under test and results in a correspondence between the height and width of the character in the pixels and the height and width of the ones as stored in various address locations throughout the pixel buffer. Similarly, all other parameters, such as the area, perimeter, calipers and digital waveform for a character can be determined by investigating the address locations which correspond to pixel locations on the page which is being scanned. The directions north, south, east and west correspond to reading up, down, right and left respectively on the page. However, the address locations in the pixel buffer are not arranged in the same physical pattern as a page of paper but rather are arranged in 16K × 1K RAMS. It is to be understood, then, that movement to the north corresponds to moving up one scan line on the page and locating that address location within the pixel buffer which corresponds to that particular direction of movement. This may require the changing of many of the X or Y address bits which define an address location in order to select the next X and Y coordinate for reading. As has been stated, the address registers and pixel buffers have been specifically designed to allow quick and easy access to the pixel buffer in this manner.

When the microprocessor enters the reading and character recognition program as shown in FIG. 8a it allows the scanner to begin to fill the pixel buffer. The microprocesor first sets the variable character count equal to zero.

The microprocessor does not begin reading data from the pixel buffer initially. As data is fed into the pixel buffer the number of black pixels in each row is sent through a counter 32, as has been explained. The microprocessor 90 first goes to the horizontal projection for each scan line to determine if there is any data in that scan line which is significant. This is an important time saving feature of this invention. The microprocessor does not read data from the pixel buffer nor even address the pixel buffer. This is a great time saving device in that addressing and reading each location in th pixel buffer is a very time consuming problem. The horizontal projection of each scan line was stored in a memory register as that scan line was fed into the pixel buffer. The horizontal projection is a numerical indication of the number of black pixels which are in a row that is a scan line. The microprocessor 90 steps down the scan lines one at a time by reading the horizontal projection until a scan line is found whose horizontal projection is above a threshold value. This is done by reading the horizontal projection in the memory. The data in the pixel buffer is not read. This horizontal projection threshold value can be set for variable sensitivity with the greatest sensitivity being when the threshold value is set to zero so that any value above zero triggers the next step in the program and a lesser sensitivity when the threshold is set to a larger integer value may be five or ten so that only a character at its thickest portion or a series of characters will trigger the next step in the program.

The microprocessor 90 will examine no data in the pixel buffer until it has stepped very quickly down the horizontal projection of the scan lines to find that scan line whose threshold value is above the determined horizontal projection threshold value. The microprocessor then continues stepping down scan lines by reading only the horizontal projection until a scan line is found whose horizontal projection is below the threshold value. The microprocessor then sets the first scan line which is greater than the horizontal projection threshold value equal to TOP Y and sets the last scan line which was above the threshold value which was followed by a scan line whose horizontal projection was below the threshold value as BOTTOM Y. If the microprocessor is searching for a horizontal projection above the threshold value and finds none the page has been completely read and the microprocessor stops reading until a new page is fed into the scanner. When the microprocessor has located the first text line on a page the Blank Line Count is set equal to zero and the number of blank lines between the top of the page and the first text line is determined using the number of scan lines. The distance between all subsequent text lines is computed using the number of scan lines between each text line. The appropriate blank lines are placed between text lines.

The microprocessor 90 is now ready to begin looking for individual characters within the text line. The microprocessor 90 looks at the vertical projection which is stored in RAM 30 for each column scan line. The perpendicular scan lne is to the scan lines which make up the text line. The vertical projection is similar to the horizontal projection except that it is perpendicular in that the vertical projection indicates columns and whether any black pixel is located in a column in the vertical dimension in the text line. A vertical projection of one is an indication that at least one black pixel is located in that vertical scan line within the designated area, in this instance, within the text line. A vertical projection of zero indicates that no black pixels are within that column. The vertical projection will be only zero or one and does not indicate the amount of pixels in that line, only whether any pixels are black, as used in the present embodiment. The microprocessor 90 reads the vertical projection which indicates whether any black pixels within a text line are contained in that column and does not address nor read any data from the pixel buffers. This saves considerable time in locating individual characters within the text line and relieves the microprocessor of having to read many blank pixels within text lines. The microprocessor does not address or read data from the pixel buffers until significant data is located and the bounds of that data are set.

The microprocessor reads the vertical projection for the column scan lines from left to right beginning at the left hand side of the page and goes until the first column is found which has a vertical projection of one and labels this location as XL, X low. The microprocessor 90 continues reading the vertical projection for each scan line going to the right until a column is found having a vertical projection equal to zero and sets this location as XH X high. The microprocessor then computes XH−XL+1 and if this difference is greater than or equal to a Bridge Width Limit threshold then the character is determined to be too wide to be a single character and the microprocessor breaks the character up before reading any data from the pixel buffers. The character is broken into two characters by establishing a new XH which is a predetermined distance from the XL which begins the character and setting all pixels beyond this XH as not within that character. This value has been selected to be the average width of a character which in one particular font is 16 pixels but of course could have any value. The Bridge Width Limit has been set large enough such that it will only be exceeded when multiple characters are touching each other with no blank spaces in between and will never be exceeded for any single characters.

When the microprocessor has established the upper and lower scan lines of the text line using the horizontal projection and the left and right column scan lines which define a character using the vertical projection the microprocessor has not yet read a single address containing data from the pixel buffers. The character has been completely isolated very quickly using data sets other than the data in the pixel buffers. These data sets were determined when the character data was fed into the pixel buffer and did not require additional time.

The microprocessor is now ready to begin addressing and reading data from the pixel buffer. The microprocessor calculates the center of the character by dividing XL+XH by two and begins at this X location at the YBOTTOM scan line and steps one pixel up at a time searching for a black pixel by addressing data within the pixel buffer. When the microprocessor locates the first black pixel the entire character is circumnavigated beginning at this pixel using the program as dictated by the memory as will be explained hereafter.

The microprocessor uses the always look-left or right rule and an initial compass heading number of west when beginning at the bottom of the character. A different compass heading number could be used if desired and if beginning from the top of the character a stable heading number is east, however, it is to be understood that the selection of an initial compass heading number is arbitrary. As the character is circumnavigated the microprocessor extracts the digital waveform which is the angle of the vector sum of the compass heading numbers as explained hereafter, area within the periphery, perimeter, minimum and maximum X, and minimum and maximum Y. If the area of the character is less than or equal to a Max Spec Area threshold value the object is considered too small to be a character so the microprocessor begins searching for the next character in the text line by looking only at the vertical projection of the perpendicular scan lines until the next character is found and discards that spec on the page. The threshold value of Max Spec Area has been set at eight pixels for Gothic 12 font however, the area may be changed for different fonts and the smaller the area the more objects the microprocessor 90 will extract all parameters data for and provide those parameters to the microprocessor 148 for character recognition. When the area is greater than the Max Spec Area threshold value the microprocessor then computes the calipers for that character. The microprocessor can compute 5, 36, or any other desired number of calipers as explained hereafter. The microprocessor then compares the perimeter of the character to a Max Two Part Character Perimeter threshold value to determine if the object may be the lower portion of a two-part character. If the perimeter is less than this threshold value, which has been set at 37 for Gothic 12 font, then the microprocessor searches all scan lines in column (XL+XH)/2 from the top of the character to YTOP which has been previously defined as representing the top of the text line. If no black pixels are encountered then the character is not a two-part character and the parameters which have been determined are transmitted to the interface unit 98 for processing and comparing by the microprocessor 148. However, if a black pixel was located the microprocessor circumnavigates the second part of the character and computes the same set of parameters for this segment of the character as the program memory dictates for all characters and provides these parameters for comparison in conjunction with the other part of the character. Examples of characters which may be two-part characters are "?", "!", ":".

After the character parameter data has been determined and sent to the microprocessor 148 it selects the matching character as explained hereafter and returns the ASCII code for that character to the microprocessor 90. If the character which is returned is an apostrophe the microprocessor 90 reads the last character which was placed in the output buffer and if it is an apostrophe and the number of scan lines between the two characters is less than a Max Apostrophe Separate threshold value, which in Gothic 12 font is 10, the microprocessor replaces the two closely spaced apostrophies with the ASCII code for a quotation mark at that location in the output buffer. The microprocessor 90 places are characters in an output buffer with appropriate spacing.

After the microprocessor 90 has circumnavigated and extracted the parameter data from the first character in the text line that parameter data is sent in the interface unit to the microprocessor 148 and the microprocessor 90 begins searching for the next character in the text line. The microprocessor searches for the next character in the text line by reading only the vertical projection representing the character information of perpendicular scan lines and not by reading individual pixels as stored as data in the pixel buffer to determine where the next character is located. This is also a significant time saving factor. The microprocessor 90 locates the subsequent characters in the text line using the same method as used to locate the first character, that is, by finding that column scan line which has a vertical projection of one and determining this as the first column scan line of the character, XL, and then continuing reading the vertical projection of each perpendicular scan line until the vertical projection is zero and establishing that column scan line as the end of the next character and sets this equal to XH. The microprocessor 90 then addresses the pixel buffer again and circumnavigates that character using the method as has been explained. The microprocessor 90 extracts the parameter data for the next character while the microprocessor 148 is comparing the character parameters from the prior character to determine a match. The microprocessor 90 continues stepping down the text line by looking at the vertical projection only and reading data within the pixel buffer only when a character has been located within a particular text line until the entire text line has been read. The microprocessor 90 loads the ASCII code for the characters into the output buffer for the entire text-line before providing an output. The text line is examined for context of the characters to determine if all characters are likely to be correct. For example, the letter "O" and the number "0", zero are determined using context rules. If either adjacent character is alphabetic, A–Z, a–z, ' or ", then the character is a letter "O" and any number "0", zero is changed to a letter "O", however, if these conditions are not satisfied all letter "O's" are changed to zeros and zeros remain zeros.

When the entire text-line has been recognized, placed in the output buffer and corrected for context, the microprocessor 90 is ready to output the text line. The entire text-line is provided as an output to any connected interface through the terminal 144.

The microprocessor 90 then begins reading the horizontal projection for a subsequent scan line until the beginning of the next text line is located and the end of the text line is as has been explained.

The microprocessor 90 continues isolating text lines and characters using only the horizontal projection and vertical projection, addressing the pixel buffer where a character is located, circumnavigating the character, determining parameters, receiving the recognized character's ASCII code from the microprocessor 148, loading the output buffer, performing context tests and providing text line outputs until the entire page has been read.

Circumnavigation

Figure 5A:
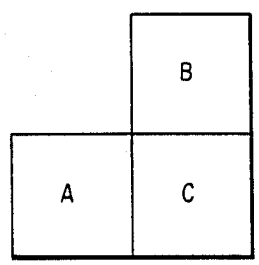
FIGS. 5a-5j show how the circumnavigation technique is used.

The circumnavigation method and parameter extraction will now be described with more detail as shown in FIGS. 5a–j, 6a–b, 7a–c, 8a–d, 9a–f, 10a–c, and 11a–d. FIG. 5a is shown as representing a character which has only three cells or pixels. Of course, this is so small it would be viewed as only a fly speck on the paper, however, this provides an example of showing how the microprocessor 90 steps around the entire periphery of the character so as to circumnavigate it. Only those cells which are at the edge or periphery of the character will be read to compute the desired parameters. FIG. 10a shows a much larger character and demonstrates that a majority of the cells representing the character under test will never be read by the microprocessor 90. The three-cell sample character of FIGS. 5a–j is so small that each cell is tested, however, it will be understood that most characters are between 10 and 22 cells wide and 15 to 30 cells high and that even periods and commas are made up of a significant number of cells. FIGS. 5a–j are merely used to illustrate the method of this invention.

Viewing FIGS. 8b and 5a–j together it is seen that in FIG. 5a the microprocessor begins the circumnavigation method. As can be seen from FIGS. 8b and 5a–j the microprocessor steps around the character using an "always look left" rule. It must be understood that "always look right" would perform identically as well. This means that the microprocessor will look at its present compass heading and test the cell which is located immediately ahead and to the left of the cell which it is currently using as the reference cell. In this respect the compass heading number is determinative of the relationship between the reference cell and the cell which will be tested next and is an aid in determining the exact X, Y position of the next cell to be tested in conjunction with the current reference cell. The location of a one bit word according to its X and Y coordinates as stored in an external memory such as the pixel buffer, DPA represents the register used to store the area of the character as it is being circumnavigated, DPL represents the register used to store the length variable of the digital planimeter and is used in conjunction with DPA to determine the area of the character being examined, PS represents the register which stores the number of straight moves where the compass heading remains unchanged during the circumnavigation and is used in conjunction with PN to determine the perimeter, PN represents the register used to record the number of turns encountered by the compass heading number during the circumnavigation and is used in conjunction with PS to determine the perimeter, CMPS is a two-bit word representing the instantaneous compass heading during the circumnavigation and in this embodiment 00=east, 01=north, 10=west, 11=south as shown at different locations on the flow chart.

VEC(N) is a one dimensional array of two bit words that will hold at most N of the most recent values of CMPS, NV is a counter which represents how many values are currently stored in VEC, VX and VY are two four bit words representing the vector sum of the current contents of VEC, NX and NY are two variables which represent the absolute number of east/west and north/south transitions respectively currently stored in VEC, WVFM (WF) is a one-dimensional array of eight-bit words representing the shape of the contour of the character being circumnavigated as determined using VEC (N) and the lookup table where WF is a counter representing how many words are currently stored in WVFM, YL and YH represent the minimum Y and maximum Y respectively encountered to that point in the circumnavigation, XL and XH represent the minimum and maximum X respectively encountered to that point in the circumnavigation, XE and YE represent the pixel on which the planimeter and is used in conjunction with DPA to determine the area of the character being examined, PS represents the circumnavigation will be completed, CE represents the compass heading number on which the circumnavigation will be completed.

X1, Y1 represents the address of the next pixel to be tested during the circumnavigation, X2, Y2 represents the second pixel to be tested if pixel X1, Y1 is white, XS, YS represent the X and Y address location of the starting pixel. As shown in the top box in FIG. 8b numerous parameters such as the waveform, area, and other variables are set to zero. The X and Y location of the first cell encountered are stored and set as the maximum and minimum X and Y encountered to that point. As shown in FIG. 8b the micrprocessor selects the next cell which will be read to determine whether it is black or white. The location of the cell being currently read, in this example, cell A, is called the reference cell. The relationship between the reference cell and the next cell to be read is determined by the compass heading. In this example, the initial compass heading is selected as east, however, the method would work just as well had a different intial compass heading been selected as will be shown by the method.

The compass heading number is a two-bit word so that incrementing the compass heading may be used to change directions, to north, for example, and decrementing may be used to select south, for example. If the compass heading is zero, decrementing would select the compass heading which represents three so that compass heading directions will be maintained as desired throughout the circumnavigation. FIG. 8b shows four boxes which correspond to the implementing of the microprocessor 90 for each of the four compass headings in this example shown as east, north, west and south. In each of the boxes VY and VX refer to the four bit words representing the vector sum of the current contents of VEC. VEC (N) is a one dimensional array of two-bit words that will hold n of the most recent values of the compass heading numbers. In this embodiment N has been set at six but could easily be set at any number depending on the amount of data and/or smoothing desired. When the compass heading is east, which is zero in this embodiment, the next cell to be tested, X1, Y1, will be located at X+1, Y−1 and the second cell to be tested in the event X1, Y1 is white labeled as cell X2, Y2 and set at X+1, Y. The DPL register which is used to determine the area is incremented. VX and VN are incremented at this point in the circumnavigation, however, as shown in another box of the flow chart of FIG. 8b VX and NX are decremented so as to be returned to their original values after the waveform has been determined.

When the compass heading is north, as shown in FIG. 8b VY is decremented and NY is incremented, X1=X−1, Y1=Y−1 and X2=X, Y2=Y−1. DPA which represents the area of the character is decremented by the value in DPL as also shown in FIGS. 10a and b. Also, as shown in FIG. 8b, when the compass heading is north at a later point on the flow chart VY is incremented and NY is decremented so as to be returned to their original values. When the compass heading is west, as shown in FIG. 8b, VX is decremented and NX is incremented, X1=X−1, Y1=Y+1 and X2=X−1, Y2=Y. DPL is decremented. At another point in the program, VX is incremented and NX is decremented so as to be returned to their original values. When the compass heading is south as shown in FIG. 8b, VY is incremented and NY is incremented, X1=X+1, Y1=Y+1 and X2=X, Y2=Y+1. DPA is incremented by the value in the DPL register. At another point in the program VY and NY are decremented so as to be returned to their original values.

Figure 5B:
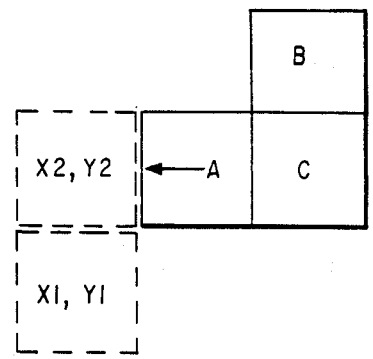

After the microprocessor has changed the values in the appropriate registers as dictated by the compass heading number, which in this first example shown in FIG. 5b is west, the microprocessor 90 is ready to continue the circumnavigation of the test character as shown in FIGS. 5a–j. The microprocessor 90 increments the counter which stores the number of compass headings in VEC and stores the current compass heading in the appropriate location within VEC. The microprocessor checks to see if N, in this embodiment shown as seven, compass headings are stored to determine if a vector sum of compass heading numbers should now be taken. If this is the first cell, encountered, as in this example, it sets the current X, Y and compass heading as the final X, Y and compass heading number for use in determining when the circumnavigation has been completed. In those cases where a sufficient number of cells have been used as reference cells so that the threshold, N, number of compass heading numbers have been located the microprocessor 90 will determine the vector sum of the most recent N compass heading numbers as shown in FIGS. 9a–f and as will be explained hereafter.

Figure 5C:
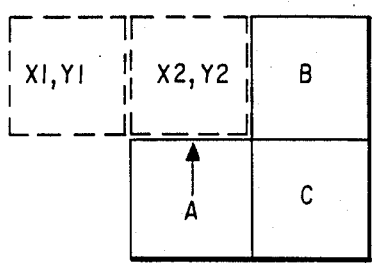

If the initial cell has not been returned to with its compass heading number the microprocessor then tests the cell located at X1, Y1 to determine whether it is black or white. As shown in the example of FIG. 5b, the cell located at X1, Y1 is white, and the cell located at X2, Y2 is also white. The microprocessor therefore decrements the compass heading and increments PN as indicated in FIG. 8b, so as to rotate the compass heading to be pointing north as indicated in FIG. 5c and returns to the top of the flow chart of FIG. 8b to begin a new set of tests using north as the compass heading number.

Figure 5D:
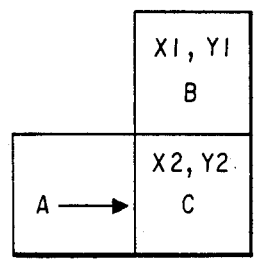

FIG. 9c shows the location of X1, Y1 and X2, Y2 for a compass heading of north, that is, a compass heading number of one. The microprocessor performs those functions shown in FIG. 8b of testing for the vector sum of the most recent in heading numbers using the new heading number as the most recent and producing a new angle of the vector sum for storage in the waveform. The microprocessor then tests cell X1, Y1 and in FIG. 5c this cell is white, therefore it tests the cell located at X2, Y2 and this cell is also white therefore it decrements the compass heading number, indicates a turn to the perimeter calculation function, PN, and returns to the beginning point for a new compass heading number which is now zero, that is, east. The test is shown in FIG. 5d for a compass heading number east as has been explained the cell immediately forward and to the left of the current compass heading is selected as X1, Y1 and X2, Y2 is located immediately ahead of the compass heading.

FIG. 9d shows that the compass heading is east and selects cells X1, Y1 and X2, Y2 for testing accordingly. The cell located at X1, Y1 is cell B and it is a black cell, therefore, the microprocessor performs the function as indicated in the box below a black test for X1, Y1 by incrementing the compass heading number, adding one to the perimeter number indicating the turn PN and setting box X1, Y1 as the new reference cell X, Y and discarding the old reference cell completely.

It is important to note that the location of each reference cell is not retained each time a new reference cell is located so that the storage location of each cell encountered during the circumnavigation is not retained. All necessary parameter data is determined during the circumnavigation so that considerable storage space is saved. Also, as can be seen from the circumnavigation, the cells representing the character which are not touching the periphery of the test character are never tested for their state. This is a considerable saving in time and memory and a considerable advantage over the prior art.

After the microprocessor 90 has determined a new reference cell it tests the X and Y of that reference cell to determine if there is a new maximum or minimum X or Y and if so stores the X or Y as the new maximum or minimum X or Y. The microprocessor then returns to that point where the compass heading number determines a new X and Y for testing from the new reference cell as shown in FIG. 8b. In FIG. 9e the new compass heading number represents north, 1, and therefore the microprocessor performs the functions as shown in the box having north where it updates the vector sum of the contents and selects which cells will be tested for black or white next.

Figure 5E:
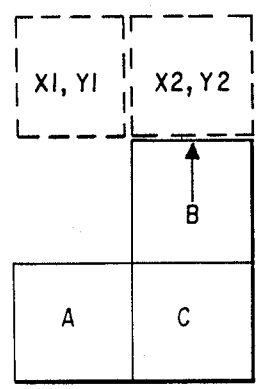

FIG. 5e shows the location of X1, Y1 and X2, Y2 for a compass heading of north, that is, a compass heading number of one. The microprocessor performs those functions shown in FIG. 8b of testing for the vector sum of the most recent N heading numbers using the new heading number as the most recent and producing a new angle of the vector sum for storage in the waveform. The microprocessor then tests cell X1, Y1 and in FIG. 5e this cell is white, therefore it tests the cell located at X2, Y2 and this cell is also white. It therefore decrements the compass heading number, indicates a turn to the perimeter calculation function and returns to the beginning point for a new compass heading number which is now zero, that is, east. The test is shown in FIG. 5f for a compass heading number east as has been explained the cell immediately forward and to the left of the current compass heading is selected as X1, Y1 and X2, Y2 is located immediately ahead of the compass heading.

Figure 5F:
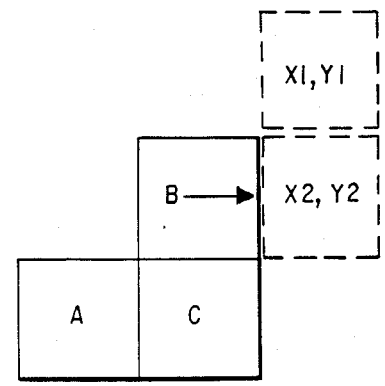
Figure 5G:
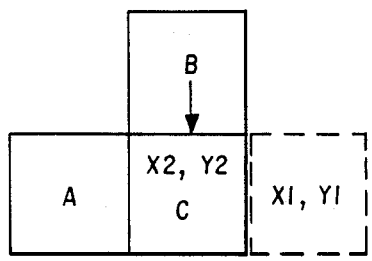

FIG. 5f shows that both X1, Y1 and X2, Y2 are white, therefore, the compass heading number is decremented again which provides a three indicating a direction of south as shown in FIG. 5g. The microprocessor then returns to the point in its function where it tests for new compass heading numbers and assigns a new value X1, Y1 and X2, Y2 to the proper cells depending on that compass heading number. In this example, where the compass heading number is south, the cells which will be tested X1=X+1 and Y1=Y+1, X2=X and Y2=Y+1 are loaded as the new cells to be tested. The microprocessor then updates the digital waveform as has been explained and provides a new angle for the vector sum of the most recent N compass heading numbers. As can be seen, a compass heading number is provided each time the direction of motion is updated even though a new reference cell has not yet been determined.

As shown in FIG. 5g cell X1, Y1 is white, however, X2, Y2 is black, therefore, the microprocessor selects cell X2, Y2 as the new reference cell and updates the perimeter function and checks to see if a new maximum or minimum X or Y has yet been encountered. The compass heading number for the new cell remains the same as the prior reference cell as shown in FIG. 8b.

Figure 5H:
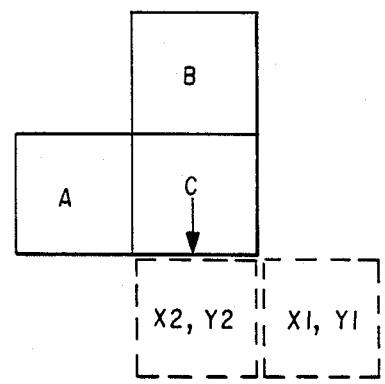
Figure 5I:
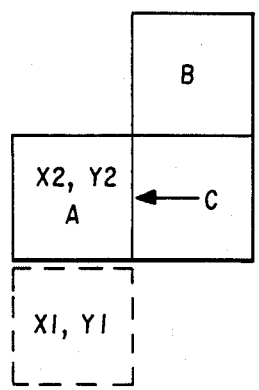

FIG. 5h shows the test from black cell C to the new test cells using south as the compass heading number while the microprocessor performs the necessary functions of updating the area and digital waveform. In FIG. 5h both X1, Y1 and X2, Y2 are white, therefore, the microprocessor decrements the compass heading number to a two, that is, west and returns to the point in its function where the new compass heading number is used to select the next cells to be tested as shown in FIG. 5i. For the west direction the next cell to be tested will be X1=X−1, Y1=Y+1 and X2=X−1, Y2=Y. The microprocessor also decrements the DPL register by one and performs the function of calculating the angle of the digital waveform as explained hereafter. The test from FIG. 5i shows that cell X1, Y1 is white, however, X2, Y2 is black, therefore, the microprocessor uses A as the new reference cell, increments the perimeter register and leaves the compass heading number the same as it was.

Figure 5J:
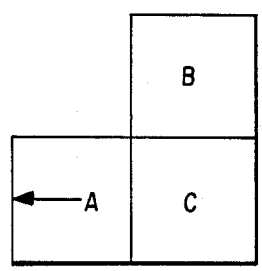
Figures 6A, 6B:
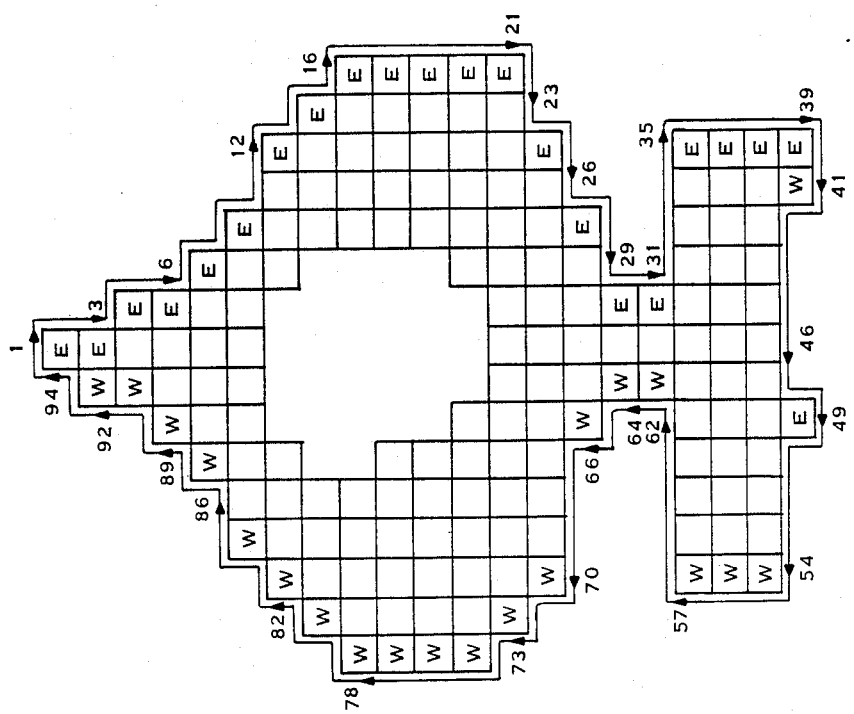
FIGS. 6a and 6b show circumnavigation as used around a sample character and the determination of the area of that character.

FIG. 5i shows that the reference cell A is the same as the initial reference cell and the compass heading number is the same. The final state of the compass heading number is shown in FIG. 5j where the initial X, Y and compass heading numbers have been returned to. At this point the circumnavigation of the character has been completed and the necessary data to determine the desired parameters have been stored in the proper registers.

Figure 8C:
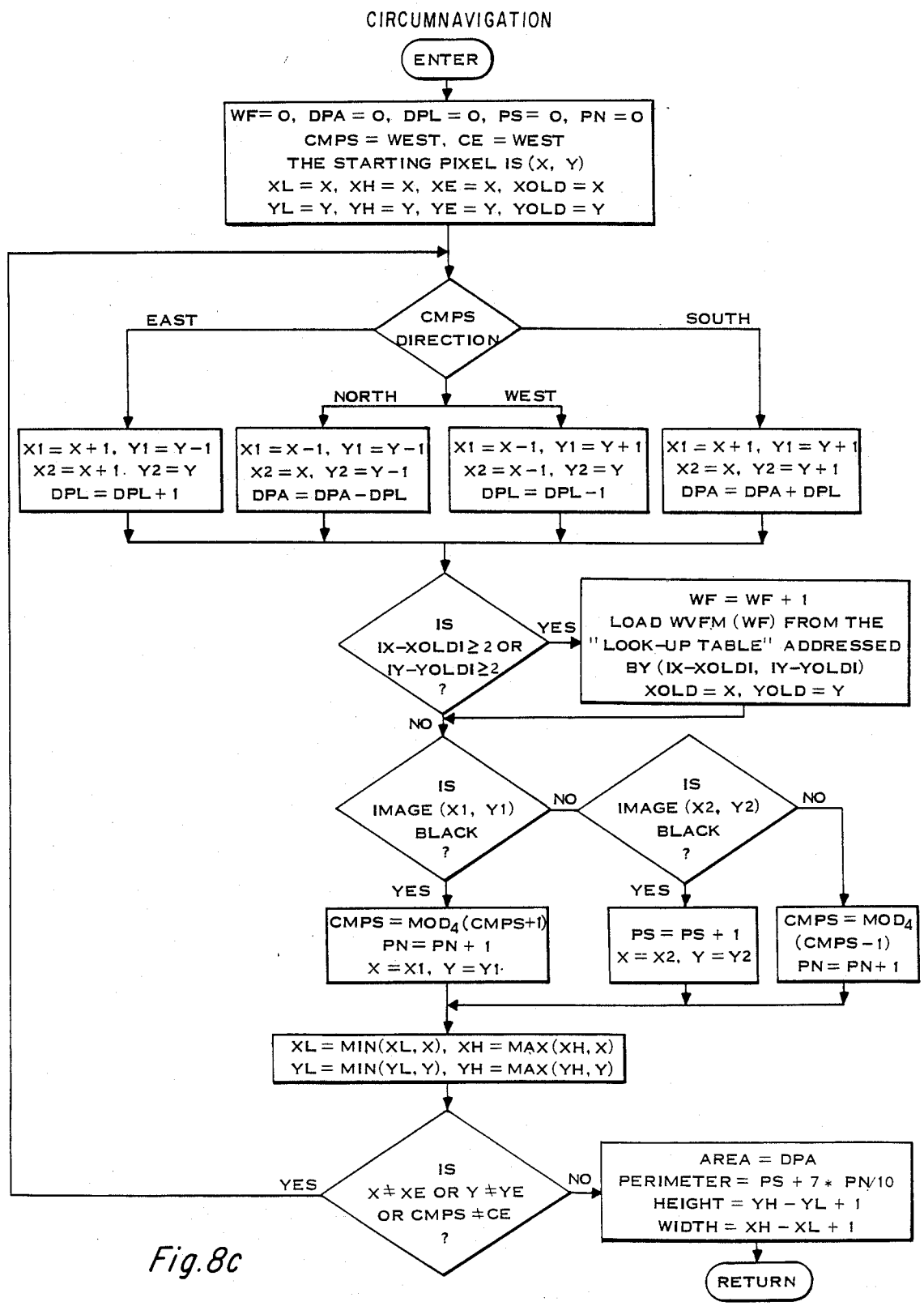

FIG. 8c shows an alternative method for performing the circumnavigation which is similiar to the flow chart shown in FIG. 8b in many respects. The key difference between FIGS. 8b and 8c is the determination of the digital waveform. As can be seen in FIG. 8b numerous variables were established to determine if N was greater than the threshold value so that the digital waveform could be read and stored in the proper location which represented the angle of the vector sum of the most recent N-compass heading numbers. FIG. 8c shows the circumnavigation which uses a different method of extracting the digital waveform as will be explained here in.

Determination of the Parameters

After the character has been circumnavigated the microprocessor determines various sets of parameters for that character depending on the embodiment which is being implemented. It is important to note that each of these sets of parameters may be used in combination with other sets or they can each be used independent of the others to perform OCR functions. For example, in one embodiment the microprocessor will determine the height, width, perimeter and area within the periphery as one set of parameters of the character. The microprocessor will also determine the digital waveform which is made up of a series of contour numbers representing the contour of the character as a second set of parameters. In another embodiment the microprocessor will determine the maximum and minimum X at each Y and the maximum and minimum Y for each X encountered during the circumnavigation and used as programable penetrators as explained herein. The microprocessor can provide an additional set of parameters which is comprised of the maximum and minimum X and Y for each Y and X respectively or can select particular Y or X values and provide only a few of these as that set of parameters according to the embodiment which is being implemented as will be explained hereafter. Each of these parameters may be used in combination with the other parameters or they can each be used independent of the others to perform OCR functions. Additional sets of parameters may be determined independently of the circumnavigation of the character being tested.

The microprocessor also uses the maximum and minimum X and Y encountered during the entire circumnavigation to determine the overall width and height of the character which has just been circumnavigated. The width of the character in pixels is determined by subtracting the minimum X from the maximum Y and adding one, $XH-XL+1$. The height of the character is determined by subtracting the minimum Y from the maximum Y and adding 1, $YH-YL+1$, to give the overall height of the character.

The perimeter of the character which has been circumnavigated is determined as follows. Each time the movement from one reference cell to the next reference cell does not require a change in the compass heading the movement is said to be a straight movement from one cell to the next. However, whenever the compass heading number changes by either being incremented or decremented this is called a turn. The compass heading can be changed by moving from one reference cell to the next which causes a turn or by remaining on the same reference cell and turning so as to present new cells for the next test. FIGS. 5a-j clearly show those times when the compass heading number would be considered going straight and those in which it would be considered as turning as has been explained. The perimeter is calculated using the formula

PER=PS+K*PN where PER is the perimeter, PS is the number of straight transitions, that is, the number of times a new reference cell was selected but the compass heading number remained unchanged, K is a constant and PN is the number of turns, that is, changes in the compass heading as the character was circumnavigated. In this embodiment $K=1\sqrt{2}$ which is approximated as $K=7/10$. This formula is more accurate for large objects on the order of over 20-30 pixels for perimeters and the larger the area the closer the approximation comes to being correct.

The area contained within the character being examined is determined by a novel technique which requires use of only the periphery of the character being tested as stored in the pixel buffer and is called the digital planimeter. A technique whereby the relationship between sequentially determined reference cells may be used to determine the area encompassed by those reference cells is used during the circumnavigation. The area of a character will correspond to the number of pixels located within the boundary of the periphery of black cells. Therefore, "t", "." and "o" each have an area within the periphery of the character which represents the number of pixels whether white or black which are within the periphery of that character. The determination of the area is as follows: two registers are set up, an area register, DPA and a length register, DPL, which may be incremented or decremented by various values throughout the circumnavigation viewing FIGS. 8b, 6a and 6b. Together, when the movement is to the East the DPL register is incremented. When the movement is to the South the DPL register is added to the DPA register, when the movement is to the West the DPL register is decremented and when the movement is to the North the DPL register is subtracted from the DPA register. At the end of the circumnavigation the DPA register contains the area within the periphery of the character in cells.

FIGS. 9a-f show the determination of the angle of the vector sum of the n most recent compass heading numbers. In each of the boxes VY and XY refer to four-bit words representing the vector sum of the current contents of VEC. VEC (N) is a one dimensional array of two-bit words that will hold N of the most recent values of the compass heading numbers. In this embodiment n has been set at 6 but could easily be set at any number from one to ten depending on the amount of data desired.

As shown in FIG. 9a the center of the circle is denoted by a box having an asterisk with each of the angles shown marked in boxes surrounding the center. As shown in FIG. 9a east is represented as zero, north as 64, west as 128 and due south as 192 so that the entire circle is comprised of 256 units from zero to 255. FIG. 9a is specifically designed for this embodiment so that if the compass heading is less than five no waveform will be provided and those angles are left off of FIG. 9a however, they could be provided if a different number of compass heading numbers were being tested. FIG. 9b shows graphically the selection of an angle from the lookup table shown in 9a after five compass headings have been determined and the angle of the vector sum is being determined. It can be seen that the first compass heading number was due north at 64 the next two were west at 128 the fourth was north and the fifth was west, thus, the angle of 104 is extracted as the angle of the vector sum. The next compass heading number in the example shown in FIG. 9c is north and the oldest compass heading number which was a north is discarded off the end and the new compass heading is placed with its tail on the point of the end of the most recent compass heading so that the vector sum is once again 104. FIG. 9d shows a compass heading of north as the next determined compass heading number which is added onto the most recent compass heading by placing its tail on the tip thereof and discarding the oldest remaining compass heading, which in this example, was west so that the next compass heading angle is 88.

FIG. 9e shows the next compass heading number having been determined as north which is added on to the prior compass headings and the oldest heading which was a west is discarded giving an angle of 74. As each of these angles are determined a line one unit long is shown represented on the graph of 9f to illustrate the final form of the digital waveform. It can be seen from this example that as the microprocessor 90 steps around a contour of the character under test the angle of the vector sum of the compass headings corresponds to the actual shape of the contour of that character. The digital waveform can be made more or less sensitive by using fewer or more compass heading numbers to produce the vector sum. The digital waveform of a "T"

would therefore be comprised of a long string of zeros representing the movement to the east across the top line then a short string of 128 representing the movement west back to the center then a long string of 192 as the microprocessor steps down, south, to the bottom of the T followed by a long string of 64 as the microprocessor steps up, north, to the top and ends with another short string of 128.

As shown in FIG. 8c the digital waveform can be extracted during the circumnavigation using a different technique than shown in FIG 8b and FIGS. 9a-e which have just been explained in detail. In this alternative embodiment a contour number is extracted only when the present reference cell is two reference cells away from the last reference cell for which a contour number was extracted in either the X or the Y direction. In FIG. 8c XOLD and YOLD represent the X and Y address for last reference cell for which a contour number was determined. When the absolute value of X-XOLD is greater than or equal to two or the absolute value of Y-YOLD is greater than or equal to two then a new contour number is selected and added into the series as a part of the digital waveform by addressing the look up table as described with respect to FIGS. 9a-e.

An important distinction between the method of FIG. 8c and the method of FIG. 9a is that the method of FIG. 8c uses only those compass heading numbers between X, Y and XOLD, YOLD to determine the angle of the vector sum of the compass heading numbers. The result is that only two or three compass heading numbers will be vector summed to each other for determination of the angle rather than five or six prior compass heading numbers as shown in FIGS. 9a-e. Therefore, the angle chart of FIG. 9a would be correspondingly smaller and have correspondingly fewer possible angles which could be reached if the flow chart of FIG. 8c is used. However, the general angle directions would be the same in both instances. Another distinction is that the method shown in FIG. 8c would result in only half as many contour numbers in the digital waveform because a contour number is determined at most for only every other reference cell and maybe for only every third reference cell which is read rather than for each reference cell as was done in the flow chart of FIG. 8b and explained with respect to FIGS. 9a-e. The digital waveform which results from FIG. 8c will necessarily be different from that which would come from using the method of FIG. 8b, however, the general contour of the character will be extracted by both and will be similar in both waveform sets. The methods of FIGS. 8b or 8c could be substituted for each other depending on the font or the characters which are being read or the desired application.

One set of parameters which may be determined independently of the circumnavigation are the calipers. A caliper is a single number which represents the number of pixels between the edge of the character at a selected location and the maximum extention of that character along the same side. In other words, the number of white cells between the edge of a box which would completely enclose the character and the first black pixel at a particular location is the value for that caliper number. In one embodiment five caliper numbers are determined and in an alternative embodiment 36 caliper numbers are determined as will now be described.

It is important to note that five caliper numbers may be used in different ways to perform character recognition then 36 caliper numbers when being compared to reference character caliper numbers has explained herein.

Figure 7A:
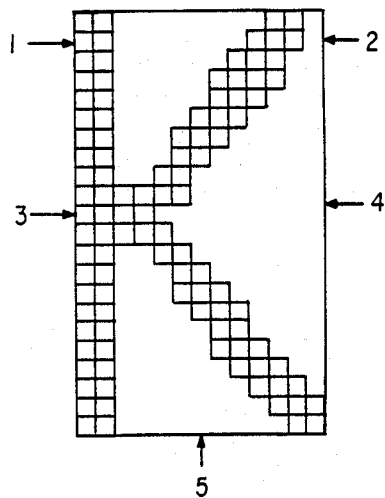
FIGS. 7a-c show the determination of caliper numbers and programmable penetrators.

FIGS. 8a and 7a show the determination of five calipers after the circumnavigation has been completed. The five calipers are determined as follows. A box is drawn around the character exactly enclosing the outer most bounds which represents the maximum extension of the character on that side of the character. This could be determined during the circumnavigation from the maximum and minimum X and maximum and minimum Y. In this embodiment calipers one and two are located one cell down, that is, southward, from the uppermost cell and penetrate towards the east and west respectively to determine the value of the caliper as shown in FIG. 7a. The caliper begins at the edge of the box and counts inward until a black cell is encountered and gives as its value the number of white cells which were encountered before a black cell was located. Caliper two similarly penetrates from the east side towards the west and counts the number of pixels encountered before a black cell is found.

As shown in FIG. 7a calipers one and two are given numeric values and in the example of the letter "K" caliper one would be zero and caliper two would be one as shown with the arrows. In this embodiment calipers three and four are placed exactly in the middle of the box on the west and east sides and penetrate towards the east and west respectively counting the number of white pixels encountered until a black pixel is found and outputting that number of white pixels as their respective caliper number. Caliper three would be given a value of zero and caliper four would have a numeric value of nine, each of which indicates the number of white pixels between the most extreme black pixel on that side of the character and the black pixel at the location which is being tested as shown in FIG. 7a. In this embodiment caliper number 5 is located on the south, that is, the bottom in the middle of the box and penetrates upward until a black pixel is encountered and outputs the number of white pixels encountered which in this example is six.

The caliper is therefore a number which represents the difference between a particular X or Y value and the maximum or minimum X or Y value encountered for that entire character. In other words, a caliper number is the difference in pixels between the edge of the character at a particular location on one side of the character and the maximum extension of that character on that same side. This is represented by beginning at the maximum extension of a black pixel on a particular side of a character and counting in from that outermost extended black pixel until a black pixel is located at the particular X or Y coordinate which is being examined by the calipers. If the caliper is being examined at the maximum extension of the character along that point the caliper would have a value of zero as shown in FIG. 7a.

The determination of these five calipers is one embodiment of the invention which may be used to provide additional data. If more data is desired it is possible to place five calipers on each side or to use only one caliper per side depending on the sensitivity which is desired. There are numerous caliper variations within the scope of this invention which could provide useful parameter data for character recognition.

Figure 7B:
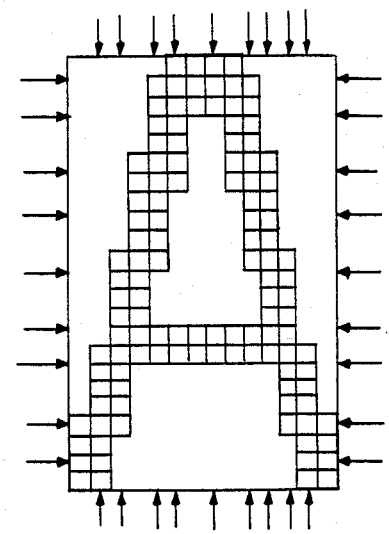

FIG. 7b is an example where a total of thirty-six calipers are determined for each character to generate the series of thirty-six caliper numbers rather than a series of five caliper numbers. The calipers of FIG. 7b have been used in an embodiment of this invention and found particularly effective and are placed around the characters as follows. Nine calipers are determined for each side as follows. Two calipers are placed one pixel in from the greatest extension on each side as shown in FIG. 7b. The remaining seven calipers are evenly spaced between the two calipers at either end. The calipers are spaced as evenly as possible by the microprocessor 90 and it will be understood that the placement of the seven calipers may be slightly different from one character to another depending on its height and width as the microprocessor attempts to space the seven calipers equally apart. The result as shown in FIG. 7b would be a string of nine calipers numbers for the top side which would be as follows: 15, 10, 1, 0, 0, 1, 5, 10, 15. A similar series of caliper numbers is determined for each of the other four sides of the character as shown in FIG. 7b. The 36 caliper number set may be used independently of the circumnavigation and may be determined independent of the character being circumnavigated. In other embodiments the 36 caliper numbers are determined after circumnavigation and after the height and width have been determined.

In one particular embodiment the character is circumnavigated and only the parameters height and width are included in the first set of parameters. A second set of parameters is comprised of the 36 caliper numbers. In this embodiment the area within the periphery and perimeter is not determined. The character is defined by a first set of paramters comprised of the height and width and the second set of parameters comprised of the 36 caliper numbers. This has been found to be an effective technique for character recognition.

During the circumnavigation the microprocessor 90 may be programmed to store the maximum and minimum X and Y encountered for each Y and X respectively. This data may be used to perform programmable penetrator tests. It is important to note that the microprocessor 90 does not select the location nor perform the programmable penetrator test. Rather, the microprocessor 90 determines and stores the maximum and minimum X for each Y encountered during the circumnavigation and the maximum and minimum for each X encountered during the circumnavigation. This data is placed in a set and is transferred to the interface unit so that the microprocessor 148 can perform programmable penetrator operations as more thoroughly explained herein.

The determination of many parameters by the microprocessor 90 has been described. These parameters may be placed and grouped together in various sets to provide first, second, third or fourth sets of parameters. The parameters which have been described are as follows: height, width, area within the periphery, perimeter, digital waveform, five calipers, 36 calipers and programmable penetrator data. These parameters may be grouped in various sets as follows: one set may be comprised as each of the individual parameters alone, for example, one set may be comprised as the height, another set may be comprised as the width, another set may be comprised as the waveform and etc.; The parameters may also be grouped with multiple parameters in each set, for example, one set may be comprised of the height and width, another set comprised of the height, width, area within the periphery and perimeter, another set comprised of the height, width and five calipers and etc. After the parameters are grouped in sets they are arranged according to a first set, second set and etc. referring to the order in which they will be compared with reference characters. Various embodiments which have been used of the sets of parameters are as follows: a first set being comprised of the height, width, area within the periphery and perimeter, and a second set being comprised of the waveform; a first set being comprised of the height, width, area within the periphery and perimeter, a second set being comprised of five calipers, a third set being comprised of the waveform; a first set being comprised of the height, width, area within the periphery and perimeter, a second set being comprised of programmable penetrators; a first set being comprised of the height and width, a second set being comprised of 36 calipers. The parameters may be combined in various sets in different order depending on the character set which is being examined. For example, a first set being comprised of the width may be followed by a second set being comprised of five calipers which may be followed by 36 calipers or the digital waveform; alternatively, the first set of parameters may be comprised of five calipers and the second set comprised of programmable penetrators or the digital waveform. It is to be understood that each of the parameters may be used in parallel with each other within a set or may be arranged in series to perform character recognition. The program in a microprocessor 90 will dictate which parameters will be extracted from each character so that the appropriate parameters may be provided to the microprocessor 148 for comparison.

The use of 9 calipers on each side of the character is particularly effective. Numerous tests were performed using 5, 6, 7, 8, 9, 10, 11 and etc. calipers on each side to recognize characters. It was determined that an odd number of calipers were more accurate than an even number of calipers. It was also determined that the placement of calipers along a side had an effect on the accuracy of calipers in recognizing characters. Additionally, the more calipers used the more time required to perform OCR. For example, in one embodiment for some fonts, it was found that 11 calipers on a side was more time consuming but was only slightly more accurate in recognizing characters. While any number of calipers at different locations would be possible the use of nine calipers on each side for a total of 36 spaced as described herein was found to be particularly favorable in performing OCR on English alphabet characters in the eight fonts being used.

The Determination of Reference Characters

The microprocessor may be taught the parameters for each reference character in the following manner. The operator provides a printed letter in the desired font so that the imager may place the letter into the pixel buffer. The operator then indicates, through the terminal, to the microprocessor that parameters are to be determined for a particular character and indicates which character those parameters are from. The microprocessor then extracts the parameters which have been described, such as the height, width, perimeter, area within the periphery, digital waveform, calipers and maximum and minimum X and Y at each Y and X respectively and places those in the storage location representative of that character in that type font. The operator will then provide many more examples of this character in the same type font often in excess of 10,000 characters for the microprocessor to use in building its reference character template for that particular character. As a different character is read which is identical to a character which is presently stored in the reference character template the microprocessor updates the template memory.

For example, the microprocessor will read thousands of "A's" and when the first "A" is read will place its height, width, perimeter and etc. parameters as corresponding to the reference character "A". When the next A is read the microprocessor will update the reference character memory if the height or the width or any other parameter of the most recently read reference character is greater than or less than the parameters for the reference characters in memory. After many characters have been read the microprocessor will establish the maximum height of an "A" which has been encountered for all "A's" and will also establish a minimum height which has been encountered for all "A's". Similarly, the microprocessor will establish maximum and minimum values encountered for each character in the alphabet for each of the parameters, such as, width, perimeter, area within the periphery and caliper numbers. Each character in the template memory will be defined by a set of parameters which will uniquely define that character. The reference character template memory will have a maximum and minimum value stored for each of the parameters which can be defined by a range so the characters will be tested to determine whether or not they fall within the range of allowance for that parameter for a particular character.

The microprocessor will determine a digital waveform for each character and place this waveform in the template memory as a reference character.

In this manner the microprocessor can be taught any character in any font and that particular character's parameters can be updated very easily. The more reference characters which are provided to make up the reference character memory the more standardized the template memory will become, however, it is understood that only a few examples of each letter is all that is necessary for the microprocessor to be provided with an adequate reference character memory to begin OCR.

The reference character template memory can be provided by numerous other means in addition to being provided through the microprocessor which does the circumnavigation. For example, one embodiment which has been used in practice is to feed test character parameters into a large computer which then performs the circumnavigation on each of the characters and provides the reference character template memory from reading numerous characters of the same type as it is taught by an operator. After the reference character template memory in the large computer has been defined then the computer can provide an output so as to make an EPROM, ROM or some other permanent memory device which is comprised of the template memory which it has stored in its databanks. In this manner the large computer may be used to read many different font types and many different scripts of alphabetic characters and provide a template memory which has reference character parameters for each of these different alphabetic scripts.

An additional set of parameters which can be used for OCR are called programmable penetrators. The programmable penetrators are unique sampling of certain parameters for particular letters which are customized to the individual letter which is being tested. The programmable penetrators are determined using the data from the maximum and minimum X and Y at each Y and X respectively which was determined during the circumnavigation. The penetrators are similar to calipers in that they measure the difference between a black pixel on one side and the maximum extension of a black pixel on that same side of a reference character at a particular location, however, they are very different from calipers because they are programmable and are changed for each letter of the alphabet and many letters do not have programmable penetrators. The programmable penetrators are used to distinguish one letter from other letters which it may be confused with after the first set of parameters have eliminated a majority of the letters from consideration. Many letters in the alphabet depending on the font cannot be confused with any other letters when only a first set of parameters comprised of the height, width, perimeter and area within the periphery is used. For example, the letter "Q" can be uniquely defined by only the first set of parameters which is comprised of the height, width, perimeter and area within the periphery. Similarly, "o" and "." can be uniquely defined by only these four parameters. Many other characters in the alphabet can be uniquely defined if their limitations of height and width are such that no other character would have the same height and width and also have a perimeter or an area within the bounds of that character.

Those characters which can be uniquely defined by only these four parameters would not have programmable penetrators but rather, in substitution thereof, would have stored in template memory an indication that the character is uniquely defined by only four parameters so that the microprocessor can indicate a match between a test character and one of these reference characters as soon as all eight tests for these first four parameters is completed.

The use of a first set of parameters to eliminate all possible reference characters is a significant factor in this invention because this comparison can be done extremely quickly for all reference characters and can save the use of time consuming comparison techniques for each letter in the reference character template. By numerous tests and reading of many fonts it can be determined which characters can be confused with other characters in a particular font by using the first set of parameters which is comprised of the height, width, perimeter and area within the periphery. For example, the letter "m" can be confused only with the letter "w" in one font, Gothic 12, of the alphabet. The letters "s, u, v, x and z" can pass the four basic parameters of the letter "n". The letter "h" has numerous characters in one font, Gothic 12, of the English alphabet which can pass all four of its basic first set of parameter tests, these are, "2, 3, 5, C, E, F, H, J, K, R, S, U, V, X, Z, k, $ and #". As can be seen with the letter "h" a significant number of characters in the alphabet are eliminated from consideration even though this letter has many other characters which can pass its four basic parameter tests. The use of these four tests in a first set of data will result in considerable savings of time even for the letter "h".

It is important to note that the use of a first set of parameters which are extremely fast in eliminating many reference characters from consideration and then the use of a second set of parameters which can more accurately define each character is often used. Usually the second set is more time consuming but much more accurate than the first set. As has been mentioned the sequence in which the various sets of parameters are used can be varied in different applications. However the use of various sets of parameters with varying speeds and character recognition capabilities is one of the features of this invention.

Figure 7C:
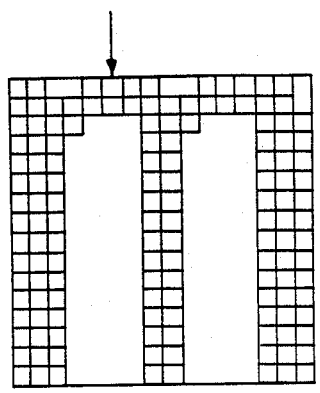

It can be determined for each character in the alphabet which characters can pass a first set of parameters for that character and these characters are used to determine the programmable penetrators for each character. The programmable penetrators are designed specifically for each character to provide one of the following operations, a penetration from any of the four sides to determine the distance to the nearest black pixel or a squeeze of two penetrators coming together along the same coordinate line from any part of the character. Each of these programmable penetrators can be determined from data which is comprised of the maximum and minimum X and Y at each Y and X respectively. For example, the letter "m" can be confused with the letter "w" after a first set of parameters comprised of the height, width, area within the periphery and perimeter have been compared. The operator could determine a programmable penetrator for the letter "m" which may be comprised of, for example, determining the value of the penetrator coming down from the top side five or six pixels over from the left hand side which for an "m" should be 0, 1, 2 but in no case should it be greater than 3 as shown in FIG. 7c. However, for a "w" a penetrator coming from the top side down at the X location which is five or six pixels in from the left hand side will be in the range of 10-15 as an average and even in worse case will never be less than 5. Thus, this penetrator can be selected by the operator as the programmable penetrator to distinguish "m" from "w" and will be used only after a set of parameters has eliminated all other characters from consideration.

Similarly, the operator can determine programmable penetrators for each character in the alphabet which will distinguish it from any other characters which can also pass its four basic parameter tests. For example, the programmable penetrator for an "n" could be to penetrate from the bottom side at the very center upward and require that the first black pixel be located at least 7-10 pixels above the bottom side in order to pass the programmable penetrator tests for an "n". As can be seen from those characters which would pass the first set of parameters of an n, "s, u, v, x, z" this particular penetrator would distinguish the letter "n" from all of these characters. Programmable penetrators for each character in the alphabet are not given herein and the examples which have been used are merely illustrative of the types of programmable penetrators which have been used in practice or which may be used. The determination of programmable penetrators will be directly related to those characters which can also pass the first set of parameters tests for that character in a particular font as the bounds may be set by the individual operator. It is important to note that in this embodiment programmable penetrators are not used to distinguish a particular character from all other characters in the alphabet but merely will be used to distinguish a particular character from a limited set of other characters which have been compared to said test character and found similar to some respects as has been explained herein.

It is also possible, in another embodiment that programmable penetrators could be used to uniquely define each character in the alphabet without the use of any other sets of parameters.

Comparison of Parameters for OCR

After a complete reference character memory has been provided the microprocessor is ready to begin OCR. The page having numerous characters to be recognized printed thereon, such as, a business letter, deposition or other paper is placed on the imager which provides an image of the page and transmits it to the pixel buffer for the microprocessor to begin parameter determination. The microprocessor reads the characters in the sequence described with respect to FIG. 8a. Parameters are then extracted for each character from the pixel buffer using the described methods.

It is to be understood that the microprocessor can be programmed to use only one or two sets of parameters in the exclusion to all others in performing character recognition or may use all sets of parameters together if desired. For example, the digital waveform alone may contain sufficient information that a character can be uniquely defined by this one set of parameters. However, this is a time consuming test as described herein and it is often desirable to use this test in conjunction with other sets of parameters which are much faster to eliminate characters which are extremely different such as all capitals for small letters as part of the OCR. Similarly, programmable penetrators can be used with the four basic circumnavigation parameters, with the digital waveform, with the five caliper or in any combination thereof. In some cases it may desirable to use all sets of the parameters if a large number of characters in the set are very similar to each other. Use of each of the sets of parameters together would be extremely sensitive and could uniquely define individual characters which were very similar to each other even in extremely large character sets comprised of several hundred or several thousand characters. In one embodiment the first set of parameters is comprised of the height and width and the second set of parameters is comprised of 36 calipers. There an alternative embodiment first set of parameters is comprised of the height, width, area within the periphery and perimeter and the second set of parameters is comprised of the digital waveform. In an alternative embodiment the first set of parameters is comprised of the height, width, area within the periphery and perimeter. A second set of parameters is comprised of five calipers and a third set of calipers is comprised of the digital waveform.

After the parameters have been extracted the parameters are sent to the microprocessor 148 for a comparison with reference characters and determination of a match of that test character with a particular reference character. The microprocessor can begin the comparison with any letter, such as "A, B, C" and etc. and proceed through all capital letters and then small letters and then numbers and then symbols or the microprocessor can be programmed to begin with the most commonly used letters in the English alphabet and proceed in any desired order, such as, "e, t, a, o, i, n, etc."

The microprocessor 148 will begin to compare the parameters of the test character with corresponding parameters of reference characters in the order dictated by the program as controlled by the operator or program. In one embodiment the first set of parameters is comprised of only the height and width of the character. In another embodiment the first set of parameters is comprised of the height, width, perimeter and area within the periphery of the characters.

The height, width, area within the periphery and perimeter are compared as follows. If the first parameter in the first set to be compared were the height of the test character the microprocessor would compare the height of the test character to the maximum height of the reference character and if the height of the test character is less than or equal to the maximum height of the reference character the test character is said to pass that reference character's maximum height test. The height of the test character is then compared with the maximum height of that reference character. If the test character's height is greater than the minimum height of the reference character then the test character is said to pass the minimum height test of the reference character. However, if the height of the test character is greater than the reference character's maximum height the test character fails to pass the reference character's maximum height test and is rejected at that point as not a match for failure to pass one of the parameter tests. If the test character passes the maximum height test of the reference character and then fails to pass the minimum height test of the reference character the reference character is rejected as not a match with the test character and the next reference character is selected for comparison. For each of the four parameters of height, width, perimeter and area within the periphery there are two tests so that each test character must pass eight reference character parameter tests in order to pass the first set of parameters. When the test character fails to pass any one of the eight tests in the first set the reference character is rejected as not a match with that test character and the next reference character's parameters are compared with that test character to determine if that test character will pass all of the four parameters in the first set of the next reference character. The microprocessor 148 continues to select reference characters from its template memory as soon as the present reference character fails to match any parameter in the first set until a reference character passes all parameter tests in the first set. At this point the second set of parameters are compared with that passing reference character's corresponding parameters.

If the reference character falls within the maximum and minimum height values then the test character's width is compared with the maximum width for that reference character and then with the minimum width of that reference charcter and if it falls within the bounds of both the maximum and the minimum then it is said to pass the width test of that reference character. In one embodiment, the next set of parameters using 36 calipers is next used to recognize each character. However, in another embodiment the test character is then compared with the maximum and minimum values of the perimeter and the area within the periphery of that particular reference character. It is to be understood that the test character could be compared with the reference characters in any order, such as, perimeter then width then area within the periphery and last height or in any desired order.

The test character is therefore first compared with the reference character's parameters using eight tests which are comprised of the maximum and minimum of each of the four parameter values which have been determined for that reference character. If the test character fails to pass any one of the eight tests for that reference character the microprocessor 148 immediately rejects that reference character as not a match and provides the subsequent reference character to begin comparison on each of the eight tests. These eight tests can be performed by micoprocessor 148 extremely quickly and are very effective in eliminating immediately from consideration any capital letters when the test character is a small letter or vice versa.

In many cases the four parameters are such that the test character is completely defined by the first eight tests and cannot pass the test of any other reference character nor can any other test character pass the test of its reference character. For example, an "o", "Q" and "." have a unique set of the four basic parameters in some fonts which completely define these characters. An "o" has an extremely large area for its small height and width and no other character in the alphabet can pass the height and width test and then also pass the minimum area test for the "o" so that the first eight tests for the four parameters uniquely defines this character. When the microprocessor 148 matches a reference character which is uniquely defined by the first set of parameters the microprocessor outputs the ASCII code of that reference character as matching the test character.

When the microprocessor 148 determines that the test character passes the entire first set of parameters of a reference character the microprocessor then compares that test character's parameters to the second set of parameters of that reference character before any more comparison is done with the first set of parameters for other reference characters in the template memory. The second set of parameters may be comprised of the digital waveform of the character, five calipers of the character, the programmable penetrators of the character, 36 calipers or any combination thereof. Each of these sets of parameters is unique in the method by which the test character's parameters are compared with the reference character's parameters and each will be described with particular detail.

In the embodiment shown in FIG. 8a the next set of test character parameters which are compared with reference character parameters are the five calipers. In this embodiment the five calipers of a test character are compared with the five calipers of a reference character in the following manner. For each of the five calipers a maximum and minimum value for that particular caliper for each reference character is stored in the template memory. A test character's corresponding caliper is compared with the reference character's caliper to determine if it is within the bounds of the maximum and minimum values of that particular caliper so that two tests are done for each caliper. If a test character fails to pass any one of the ten caliper tests which represent the maximum and minimum values for the five calipers then the reference character is rejected as not matching the test character and the next reference character is selected for comparison. The method described herein by which 36 calipers are compared is considerably different than the five caliper test just described.

The comparison and reference character matching technique of the digital waveform and 36 calipers is considerably different from each other and from the other parameter tests. Each reference character which is compared with the waveform or the 36 calipers of the test character is given a score which is saved with respect to that reference character. After all reference characters have been compared with the test character's waveform or 36 calipers the microprocessor 148 selects that reference character which had the "best" score as the passing character for that set of parameters.

In this respect the use of one of the pass or fail sets of parameters for a first set to eliminate a large number of characters from consideration and then comparing each of the reference characters which passes the first set using either the waveform or 36 calipers to determine a match is a considerable time saving method.

In one embodiment the second set of parameters will only be determined if the first set of parameters does not uniquely define the test character as has been explained herein. In this instance it is certain that at least one other reference character can also pass the first set of parameter tests for that test character. The microprocessor will select each reference character in the template memory for comparison with the first set of parameters of that test character. The microprocessor will continue comparing the first set of parameters of the test characters until a character has been found which passes all of the first set of parameters tests. The microprocessor will then perform the digital waveform comparison and provide the integral of the area between the curves in the methods which are described herein. This integral will be saved as the score for that reference character. The microprocessor then continues to compare the first set of parameters of the test characters to every reference character in the template memory and determines the integral of the area between the curves for each character in the template memory which passes the first set of parameters.

After all reference characters have been examined the microprocessor compares the integral of the areas under the curves for each of the reference characters which have been determined and have been stored in memory. The microprocessor will select that integral which has the lowest value as the passing integral and will provide that reference character as passing both the first and second set of parameters for that test character. For example, the letters "s, u, v, x and z" can pass the first set of parameters for the letter "n", however, the digital waveform of "s" is very different from the digital waveform of "n" so that the integral of the area between the curves will be very large. The integral of the area between the digital waveforms is significantly larger for each character which is not identical to the character being tested. The digital waveform technique is time consuming and requires a large number of computations as compared with determining the first set of parameters. It is therefore more efficient for the microprocessor to sort out only those characters which would be confused after the first set of parameters have been tested and then perform the digital waveform or 36 caliper test on those few remaining characters which can be confused with each other.

The methods by which the digital waveform of a test character can be compared with the digital waveform of a reference character will now be described. Three different methods of comparison which are considerably different from each other have been determined. Each of these methods will be described with particular detail.

Figure 8D:
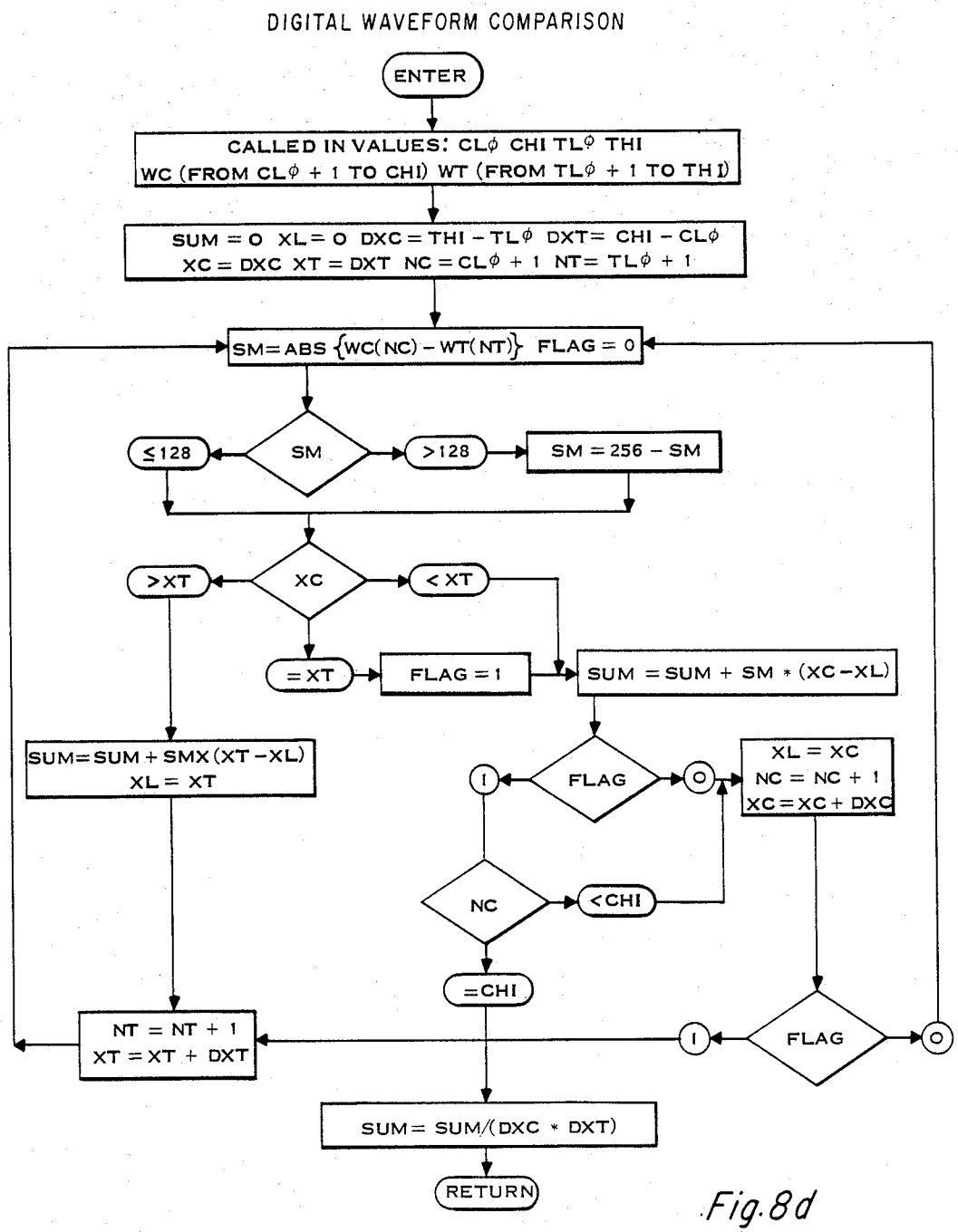

The simplest method and the one which is used in the embodiment shown in FIG. 8a in reading characters of alphabetic type is shown by the flow chart of FIG. 8d. In the flow chart of FIG. 8d the variables stand for the following: WC(N) represents the series of contour numbers comprising the waveform of the character wherein N is a particular contour number at a specified location within the waveform: WT(N) is the series of contour numbers comprising the digital waveform for the reference character as stored in the template memory wherein N represents a particular contour number within the waveform: CLO and TLO indicate where to begin comparison within WC(N) and WT(N) respectively, CHI and THI tell where to end the digital waveforms WC(N) and WT(N) respectively; SUM is a word which is the accumulation of the integral to that point in the waveform comparison and at the end of the comparison contains the entire integral which is the recognition score, SM is a word indicating the instantaneous value of the integral; DXC and DXT are words used for character and template "yardsticks" respectively, NC and NT are words which indicate counters for WC(N) and WT(N) respectively, XC and XT are words which indicate the cumulative progress through the respective character and reference character waveforms, XL is a word which is a cumulative indicator of the progress in carrying the entire integral for the comparison of the two digital wave forms and FLAG is a status word which is set low to indicate the program should continue stepping as usual or set high to flag movement to a different step in the program.

Figure 10B:
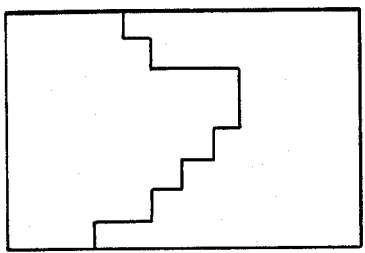
FIGS. 10a-10c show how a test character's waveform is normalized to a reference character's waveform.
Figure 10A:
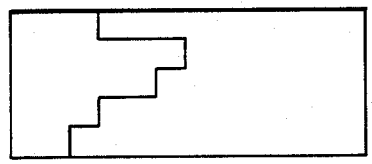
Figure 10C:
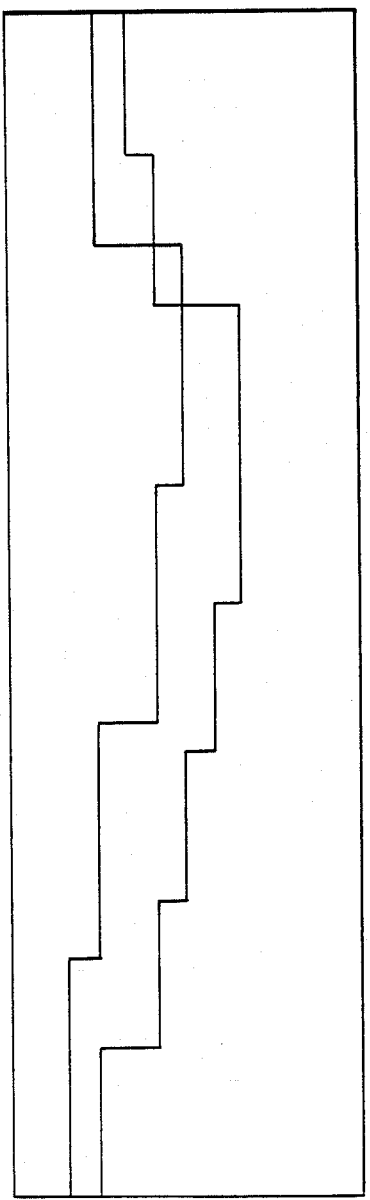

The digital waveforms of a test character and a reference character are shown in FIGS. 10a and 10b respectively. The digital waveforms are shown placed on top of each other in FIG. 10c as would be done in carrying out the comparison between the two waveforms. The digital waveform score is the integral of the area which is between the two curves. As shown in FIG. 10c the two digital waveforms are placed on top of each other and a certain amount of area exists between these two waveforms. The difference between the waveforms is indicated as the area within the curve which is set by the bounds of the two waveforms and the ends of the box as shown in FIG. 10c.

The waveform comparison is done as shown in FIG. 8d by taking the integral of the area between the two curves. Initially each of the values is set to the desired starting point and the absolute value of the areas between the curves is integrated along the entire lengths so that an entire integral is stored in the SUM register. As can be seen from FIG. 10c when the digital waveforms are similar to each other the area between the curves will be very small and ideally would be zero. However, the area is rarely zero because the two characters often are not comprised of exactly the same pixel patterns.

In this embodiment of the invention a digital waveform comparison is done between the two waveforms and a score determined as the integral. Then the character waveform is circularly shifted left six points and a score is determined as the integral. Then the character waveform is circularly shifted right six points from the initial starting position and the entire integral is determined again. The lowest of the three scores is taken as the best score for that particular reference character from the template memory.

This shifting is done to compensate for any offset between the two waveforms. As has been explained the digital waveform is a general indication of the overall curvature of the contour of the characters. Therefore, the digital wave form of an "n" and a "u" would be exact opposites of each other and would give a very large integral value each time they were compared with each other. Similarly, all other characters in the alphabet have considerably different values of their contours than any other character in the alphabet and can be distinguished from each other simply by selecting that reference character as the match which has the lowest integral of the area between the two curves as has been explained and is shown in FIG. 8d.

It may be desirable in some instances, for example, when handwriting is being compared to use considerably more detailed comparison techniques for digital waveforms. The novel techniques which may be used when considerably more detail is desired will now be described. It is to be understood that these techniques could also be used in recognizing printed text. FIG. 9f shows a generated digital waveform from the stepping around a character as illustrated in FIGS. 9a–e as has been explained. When an entire character has been circumnavigated and the digital waveform determined the waveform would look similar to that shown in FIG. 10a. In FIG. 10a the test character would have a series of abrupt steps representing the angle of the vector sum of the compass heading numbers for the character with an angle of zero being at the bottom and an angle of 255 being near the top. The digital waveform has discrete angle values at each location which values may also be provided as numerical outputs and referred to as contour numbers.

The first step in comparing a test character's digital waveform to a reference character's digital waveform is to size normalize the two values to each other. This is done by determining the number of contour numbers which are in the test character and multiplying this number by the number of contour numbers in the reference character's digital waveform and then multiplying the number of contour numbers in the reference character by the number of contour numbers in the test character as is commonly done to provide a least common denominator of the two digital waveforms as shown in FIG. 10c. After the digital waveforms have been size normalized to each other the microprocessor 148 then aligns the characters' digital waveforms with each other as shown in FIGS. 11a–d.

Two different techniques for aligning the digital waveforms of test characters with reference characters will now be described with respect to FIGS. 11a–d. In the first technique, as shown in FIG. 11a, the two characters are first size normalized in each other as has been explained and then the microprocessor 148 locates primary buoys in the test character and in the reference character. The first primary buoy is determined as that part of the digital waveform which has the greatest increase from one angle to the next over the shortest distance. The microprocessor determines the angle having the most abrupt change by taking the derivative of the digital waveform at all locations and that part of the digital waveform having the greatest derivative will have the sharpest slope and will be determined as the first primary buoy in each of the digital waveforms. The microprocessor will then match the first primary buoy of the reference character with the first primary buoy of the test character, that is within a threshold number of contour numbers, as shown in FIG. 11a. The microprocessor will then locate the second primary buoy which has the second largest abrupt change in each of the digital waveforms and match them with each other.

Figure 11C:
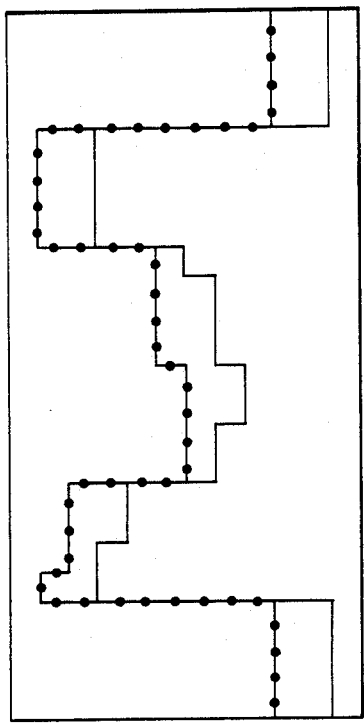
FIGS. 11a-11d show how a test character's waveform is compared with a reference character's waveform by aligning buoys and removing any slant before the comparison.
Figure 11D:
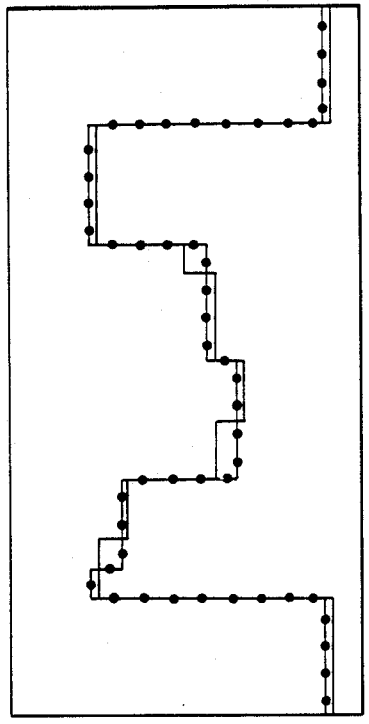
Figure 11A:
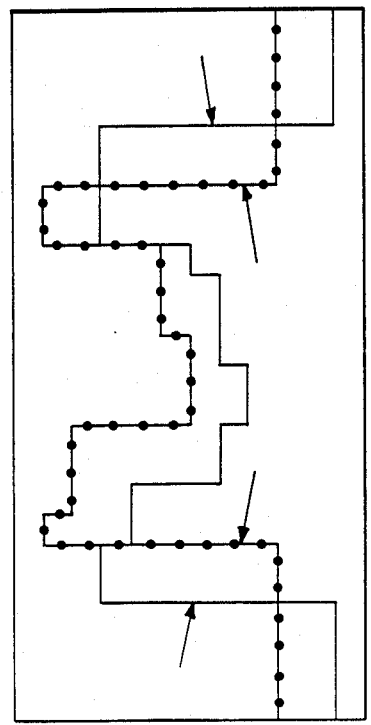
Figure 11B:
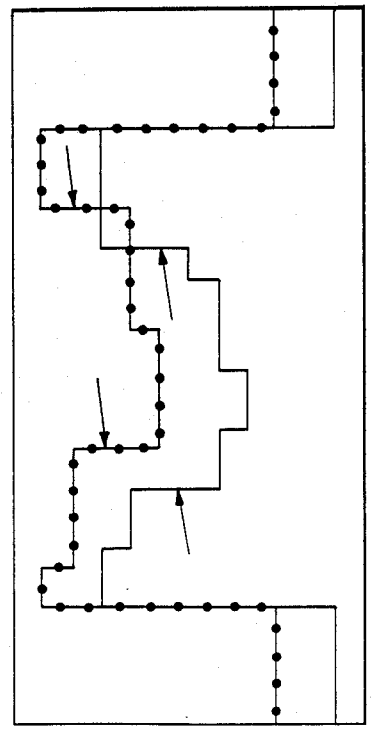

FIG. 11b shows the test character as matched with the primary buoys aligned exactly on top of each other for the reference character and the test character. It can be seen from FIG. 11b that this also requires size normalization at some points of the character so that the primary buoys will align with each other. After the primary buoys are aligned with each other and the digital waveforms on either side of the buoy size normalized with each other, the microprocessor then searches for secondary buoys beginning at the next most abrupt change in the digital waveforms and matches them with each other and continues matching abrupt changes in the digital waveforms to each other in accordance with the desired number of buoys.

The number of buoys which will be matched is set by a threshold value of the derivative of the digital waveforms. That is, when the derivative of the waveform falls below a certain threshold value the microprocessor will have determined a certain number of buoys whose slope is greater than that threshold value and will have matched them with each other on the two waveforms. This threshold value can be set to provide as few or as many waveforms as desired. A working model has shown that between 8–15 is sufficient to provide the desired matching of the characters with each other.

FIG. 11c shows the matching of the characters where only four buoys have been used for simplicity in an illustration, however, it is to be understood that most characters would have significantly more data in their digital waveforms with many more buoys. The threshold value of the derivative to determine buoys can be varied by the microprocessor. If the number of buoys located is lower than a certain number, for example, less than eight, the microprocessor will automatically lower the threshold and search for additional buoys which are above the now lowered derivative threshold value. Similarly, if the microprocessor completes the buoy matching and reaches the threshold value for the derivative and finds that in excess of 15 buoys for the digital waveform have been located the microprocessor will automatically raise the threshold for the derivative and perform the derivative comparison and buoy matching again so that fewer than the maximum number of buoys are now provided.

After the buoys have been matched with each other as shown in FIG. 11c the microprocessor then checks for slant in the test character with respect to the reference character which will show only as DC bias in the digital waveform. This is a significant advantage of the digital waveform over other forms of character recognition. If the character is slanted considerably or even sideways the microprocessor will receive the digital waveform which will give the exact shape of the character and the slant will show up only as a DC bias or an offset because the contour numbers represent the curvature of the character with respect to itself and each contour member is an average of the curvature of the character for the prior predetermined distance over that character. The contour numbers are not determined with respect to an up, down or other outside source but only with respect to the curvature of the character with respect to itself. The microprocessor 148 is therefore able to match waveforms of similar characters which are slanted with respect to each other by removing any DC bias as shown in FIGS. 11c and 11d. After the DC bias is removed the digital waveforms will be exactly on top of each other as shown in FIG. 11d. Those locations which will not be exactly matched with each other will be those points where buoys have not been determined and aligned with each other. It is to be understood that many parts in the digital waveforms will not be significant enough to be buoys and therefore the digital waveforms of the characters will have offsets from each other at various locations as shown in FIG. 11d.

The microprocessor is now ready to determine a score for this reference character with respect to the test character. The microprocessor determines the score by taking the integral of the area between the two curves which are shown in FIG. 11d. The result is that the microprocessor determines the integral of the difference between the two curves at all locations over the entire digital waveform. Where the digital waveforms are exactly on top of each other as shown in parts of FIG. 11d the integral of the area between the two curves will be very small, however, at some points the integral of the difference which represents the area within the curves will be significant. The microprocessor determines the integral of the entire area between the curves for their entire length. This integral is the score of that reference character with respect to that test character which represents the second set of parameters in the digital waveform embodiment.

An alternate technique of matching digital waveforms to each other will now be described. The digital waveforms are size normalized to each other as shown in FIGS. 11c and 11a, however, the microprocessor does not locate primary or secondary buoys. In this embodiment the microprocessor begins at one end of the digital waveforms and computes the derivative of the digital waveform at each point along the curve. When the digital waveform exceeds the predetermined threshold amount the microprocessor determines this as a first buoy. The microprocessor continues determining the derivative of the digital waveforms until a predetermined numbe of buoys have been located, usually four. The microprocessor will then perform a function which is known as dynamic programming with respect to the two digital waveforms. The microprocessor will match the first buoy in each of the curves with each other and determine the area under the curve to that point in the digital waveform. The microprocessor will then match the first buoy in the test character to the second buoy in the reference character and determine another integral.

The microprocessor will continue to match the first buoy of the test character with each of the buoys in the reference character up to a predetermined number which is usually set at four but could be varied to any value determined by the operator. For each of these matches the microprocessor determines the integral of the area of the difference between the curves to that point in the digital waveforms. The microprocessor then matches the second buoy with the second buoy in the reference character while matching the first buoy of each of the waveforms with each other and determines an integral at this point in the curve. The microprocessor will then match the first buoy of the test character with the second buoy in the reference character which means that the second buoy of the test character cannot be matched with the second buoy of the reference character but must be matched with either the third, fourth or etc. The microprocessor then performs the integral of the area of the difference for each of these matches by matching the second buoy of the reference character with the third, fourth and etc. buoys of the reference character and determines the integral of the area under the curve for each of these matches. The microprocessor then begins with the third buoy of the test character and matches this with each buoy of the reference character and also provides the other combinations including matching the first buoy of the test character with the third buoy of the reference character while matching the third buoy of the test character with either the fourth, fifth and etc. buoy of the reference character and also while matching the second buoy of the test character with one of the other unmatched buoys of the reference character within the set.

For four buoys, a large number of combinations of the buoys matching with each other can be determined and the integral of the area under the curve for each of these buoy matching techniques is determined. The result is that an N number of buoys will be placed in a set with each other and matched with an N number of buoys of the reference character and the set will shifted down the waveform one buoy at a time after the integral of the area between the two curves has been determined for the entire first set. Only the lowest integrals will be saved as possible correct matches of buoys. For example, the lowest nine integrals can be saved and carried with the operation but an integral in the first set which is not in the lowest nine will be discarded and that set will not be used for comparison with other sets as the comparison is done moving down the digital waveforms.

This technique, known as dynamic programming, is an extremely valuable technique in this invention to provide for the correct matching of those parts of the waveform with each other which provide the lowest possible integral. This is an important technique for this invention because when large numbers of buoys, such as 15, are determined it would take a considerable amount of time to match each of the buoys in the test character's waveform with each of the buoys in the reference character's waveform and determine the integral of the area under the curve for each of the possible combinations. However, with this technique the digital waveforms are compared and an integral provided for a small subset of N buoys within a set and only the lowest integrals within that set are retained and no other buoy matching is done with other buoys which do not fall in a set with each other. After the integrals for each of the possible combinations have been determined the integrals from the next set are added onto the corresponding integrals of the prior set to provide another set of integrals whose lowest values will be retaind and whose highest values will be discarded as not possible matches.

When the last set is determined that integral which has the lowest value will be said to be the correct match of buoys of the test character's digital waveform to the reference character's digital waveform. This method of matching buoys of waveforms to each other is useful where many different styles of letters are used as is done in cursive handwriting or in hand written print. This technique is a preferred embodiment when there is considerable variation of a particular letter as is commonly done in handwritten letters. However, it is to be understood that the technique of locating and matching primary buoys and secondary buoys as has been explained may also be used for handwritten or printed characters from typewriters.

The score of the digital waveform of each character for each reference character is saved and such scores are compared with each other. The integral with the lowest value is presented as matching the test character as has been explained.

Three methods of comparing waveforms of characters to each other have been described. Two of the methods required special alignment techniques whereas one rotated the waveforms with respect to each other to adjust for any misalignment. It is to be understood that any of these methods would be useful on printed text, handwritten text or in analyzing characters in other languages, such as Chinese, German, Russian or etc. One method may be more useful than the others, depending on the characters being recognized.

Another set of parameters which may be substituted as the second set of parameters after the first set is the 36 calipers. In one embodiment the first set of parameters is comprised of only the height and width of the character and the second set is comprised of the 36 calipers. It may be possible to use the 36 calipers after the five calipers because the comparison techniques are considerably different from each other. The matching of the test character's 36 calipers to the reference character's 36 calipers is done as follows.

The caliper numbers will be a series of 36 numbers which represent the difference in pixels between the greatest extension of a character on one side and the location of that caliper on that side of the character. The microprocessor will compare the first caliper number of the reference character with the first caliper number of the test character and provide the difference between the two numbers as an output. The sum of the differences between each of the 36 calipers numbers is provided as the score. When a test character matches a reference character the score which is the sum of the outputs for each caliper will ideally be 0 and in practice is a very low number. However, when the test character and reference character do not match the score will be significantly larger than when they do match. The score for each reference character is saved and that character having the lowest score is promoted as the match. The first set of parameters is a pass-fail test as described herein, and only those reference characters which pass the first set are compared with the caliper numbers. This is a singificant time saving feature. Either 36 calipers or waveform technique may be used as a second set of parameters to provide a perfect match so that the microprocessor 148 can output the ASCII code of the reference character as matching a particular test character. Both the 36 calipers and waveform determine a score for each reference character as compared with the test character and that reference character having the best score is selected as passing. In the embodiment described herein wherein 36 calipers are provided with nine on each of the four sides of the character a means of weighting each caliper number has been used.

When a weighting factor is used for the 36 calipers the microprocessor 148 is provided in the template memory with the ideal value of the caliper number and a range which might be acceptable for that caliper. When the caliper number falls outside the range the difference between the numbers is multiplied by a factor of four. For example, if caliper number one had an ideal value of four and a range of two as stored in the reference character template memory then if a caliper having a value of three were compared with that caliper the output from the comparison would be one which represents the difference between the two numbers. However, if the caliper which were compared with this first caliper had a value of nine the microprocessor would provided fourteen rather than five as the result of the comparison of the two values. The number fourteen is derived by counting the different between the two numbers as two within the range of two for the number four and three for the number outside that range. The difference in the number outside the range is multiplied by a penalty factor of four so that the result is 12 plus two for a total value of 14. In this embodiment the ideal caliper number is determined by taking the mean of several thousand test characters and using this as the ideal caliper number and then determining a range which has been found for acceptable characters. The range could be zero for those parts of the character which must correspond identically to each other in order to provide a match, however, the range may be as high as 20 for those parts of the character which are more variable from character to character. This embodiment of providing caliper comparison has been found to be particularly effective when used in conjunction with a first set of parameters comprised of height and width.

Another set of parameters which has been described herein are programmable penetrators. Programmable penetrators of the test character are compared with the reference character in a unique manner which is considerably different from either the caliper or digital waveform comparison techniques. The programmable penetrators have been determined for each character in the manner explained herein and stored in the reference character template memory. However, the programmable penetrator locations have not been determined for the test character during the circumnavigation because the microprocessor 90 which performed the circumnavigation did not know which penetrators to take the values for. Rather the microprocessor 90 provided the maximum and minimum X and Y for each Y and X respectively and stored these numbers in a memory register during the circumnavigation as has been explained herein.

The microprocessor 90 provides these numbers to the microprocessor 148 which will determine the location of the programmable penetrators as dictated by the reference character's parameters. The programmable penetrator test is a pass or fail test and is done very quickly to determine if a particular reference character matches that test character. The location of the programmable penetrator for each character will be different and will be determined beforehand by an operator as has been described herein. Those characters which can be uniquely defined by the first set of parameters will not have a programmable penetrator but rather the microprocessor will provide the ASCII code of these characters as a matching output as soon as a reference character passes each of the first set of parameter tests. However, many reference characters will pass the first set of parameters for one test character when the first set of parameters is comprised of the height, width, perimeter and area within the periphery of the test character.

The programmable penetrator will be selected to particularly distinguish only between those few characters which can pass each other's tests for the first set of parameters.

Assume that the letter "n" is being read as a test character. Since the letter "u" passes the entire first set of parameters tests the microprocessor will continue testing that character to determine if it is a letter "u". The microprocessor 148 will perform a programmable penetrator as the second set of parameters as dictated by the template memory for each reference character. The programmable penetrator for "u" might be selected as the minimum Y value for an X value in the very top center of the character. This would be the equivalent of inserting a penetrator from the top of the character straight downward looking for the first black pixel.

It is significant that the microprocessor 90 did not perform this pixel count operation nor did it form a window around the character during the circumnavigation. Rather, it merely provided the maximum and minimum Y values for every X value in the character and the microprocessor 148 will select that particular X value to determine what the minimum Y value is at that point. For the letter "u" the minimum Y value must necessarily be in excess of eight and will be likely be ten. The microprocessor will then test the character to determine what its minimum Y value is at the X value which has been determined by the template memory as the programmable penetrator location. If that value is greater than eight the microprocessor will do no more comparisons but will provide the ASCII code as an output for this character as being a "u". However, in this example, the character actually read is a "n" so that the value will likely be 0 and at greatest will have a value of 2. The microprocessor will then recognize that this character is not a "u" and will reject that reference character immediately without storing any of the tested values and go to the next reference character for comparison with the first set of parameters. Thus a pass-fail test is performed. In this example, the next reference character whose parameters will pass the test character's first set of parameters might be a "z". The programmable penetrator for a "z" will likely be to determine the maximum Y value at the X value located in the immediate bottom side of the test character and require that this value be less than two in order to match as a "z". When this test is performed on the "n" the value will be about 8-10 and will fail to pass the programmable penetrator test for "z". The microprocessor will then reject this reference character as failing and continue to the next reference character until the reference character's parameters for a "n" pass the first set of tests for the test character.

The microprocessor then performs the programmable penetrator of an "n" as dictated by the reference character's template memory on the test character which will likely be comprised of testing for the maximum Y value at the X value located at the center of the bottom side of the test character and will require that this value be in excess of eight in order for the character to be recognized as a "n". When this programmable penetrator test is performed by reading the minimum Y value of the test character at the desired X location the microprocessor will determine that the test character is a "n" and will output the ASCII code for an "n" as a matching character without doing any more comparison tests.

The programmable penetrators can be designed to check any X or Y value at any other X or Y value or to provide a pinching operation which is the determination of both the maximum and minimum X values at a particular Y value or vice versa. The pincher technique is useful in distinguishing a "v" from a "u", for example.

The programmable penetrator operation is significantly different from the wave form or 36 calipers because yes or no output is provided as to whether the reference character matches without doing any other comparison with other reference characters. When the digital waveform or calipers are used as the second set of parameters the microprocessor must determine the second set of parameters for every reference character in the template memory which passes the first set of parameters and then determine which of all these characters has the closest match of the second set of parameters of the test character with the reference character as has been explained herein.

The method of character recognition described herein could be used on numerous other hardware systems. In one embodiment an IBM personal computer, TI personal computer, or other similar system may be used to perform character recognition. A scanner and pixel buffer could be connected to the computer and the method described herein performed by these computers to recognize characters. The methods are not necessarily restricted to use on the particular hardware described herein.

It is to be understood that this method of operation will be very useful with many other apparatuses in addition to the apparatus which has been described herein. Different microprocessors and different methods of reading could be used with the method as described herein. Similarly, the apparatus as described herein could operate using different methods. The scope of the invention is not limited in any way by the examples of descriptions which have been given herein, but is meant to cover any method or apparatus which comes within the scopes of the claims attached hereto.

We claim:

1. The method of isolating and reading character data for character recognition comprising:
   (a) scanning a portion of a page having characters thereon with an imager to generate character data arranged in scan lines representative of said character and storing said character data,
   (b) generating a first data set indicative of the amount of character data in each scan line,
   (c) determining that a scan line contains significant character data only when corresponding data from said first set is above a scan line threshold value,
   (d) reading character data only in scan lines which contain significant character information.

2. The method according to claim 1 further comprising:
   (a) generating a second data set indicative of the character content of pixel lines perpendicular to said scan lines,
   (b) determining that a perdendicular pixel line contains significant character data only when corresponding data from said second set is above a pixel line threshold value,
   (c) reading character data only from pixel lines which contain significant character data.

3. The method according to claim 2 further comprising:
   (a) determining the beginning and ending scan lines of a text line at characters,
   (b) determining the beginning and ending perpendicular pixel lines for a character within said text line,
   (c) reading said character data beginning at a point between said beginning and ending perpendicular pixel lines,
   (d) generating parameter data from said reading sequence,
   (e) recognizing said character from said parameter data and providing a number representative of said character in an output buffer,
   (f) repeating steps b-e until all characters within said text line have been read,
   (g) outputting said numbers from said output buffer when an entire text line has been read,
   (h) repeating steps a-f until all text lines on said page have been read.

4. The method accroding to claim 3 wherein characters adjacent to any "O" or "zero" in said output buffer are read and when either adjacent character is alphabetic setting any "zero" to an "O", otherwise setting an "O" to a "zero" prior to outputting said numbers from said output buffer.

5. The method according to claim 3 wherein the parameter data is comprised of the height, width, perimeter and area within the periphery of said character.

6. The method according to claim 5 wherein determining the beginning and ending perpendicular pixel lines for a character is comprised of:
   (a) reading data from said third set in sequential order,
   (b) selecting as the beginning of a character the left most pixel line whose corresponding data from the second set is above a threshold value,
   (c) selecting as the end of a character the right most pixel line whose corresponding data from the second set is above the threshold value when the right adjacent pixel line is below the threshold value.

7. The method according to claim 6 wherein a character is determined to be too wide to be a single character when the number of pixel lines from the beginning pixel line to the end pixel line exceeds a single character threshold value.

8. The emthod according to claim 7 wherein a character which is too wide to be a single character is split into two characters by selecting as the right most pixel line of said character a pixel line which is a predetermined number of pixel lines from the left most pixel line.

9. THe method according to claim 6 wherein the character is rejected as not a character when the area is less than a threshold area value.

10. The method according to claim 6 comprising reading character data immediately above said character within said text line when the perimeter of said character is below a threshold perimeter value indicating that a two-part character might exist.

11. The method according to claim 3 further comprising: placing the appropriate spaces between sequential characters by determining the number of perpendicular pixel lines between said characters and placing the appropriate space in said output buffer.

12. The method according to claim 3 further comprising:
   (a) determining if adjacent apostrophies are in said output buffer,
   (b) determining the number of pixel lines between any adjacent apostrophies,
   (c) changing the numbers representing the two apostrophies to a single number representing a quotation mark when the number of pixels between them is less than an apostrophe threshold value.

13. The method of isolating a text line of characters comprising:
   (a) scanning a portion of a page having characters thereon with an imager to generate character data arranged in scan lines representative of said character and storing said character data,
   (b) generating a first data set indicative of the amound of character data in each scan line,
   (c) reading data from said first set,
   (d) selecting as the beginning of a text line the upper most scan lines whose corresponding data from the first set is above a scan line threshold value,
   (e) selecting as the end of a text line the lower most scan line whose corresponding data from the first set is above the scan line threshold value when the lower adjacent scan line is below the scan line threshold value.

14. The method according to claim 13 wherein individual characters within said text line are isolated by the method comprising:
   (a) generating a second data set indicative of the amount of character information in pixel lines which are perpendicular to the scan lines.
   (b) reading data from said second set,
   (c) selecting as the beginning of a character the left most scan line whose correpsonding data from the second set is above the pixel line and threshold value,
   (d) selecting as the end of a character the right most pixel line whose corresponding data from the second set is above the pixel line threshold value from the right adjacent pixel line is below the pixel line threshold value.

15. The method of isolating text lines for character recognition comprising:
   (a) scanning a portion of a page having characters thereon with an imager to generate character data arranged in scan lines representative of said character,
   (b) storing said character data in a plurality of storage means,
   (c) determining the upper most scan line of a text line of characters,
   (d) determining the lower most scan line of the text line of characters,
   (e) storing all character data within the isolated text line in a single storing means,
   (f) storing the subsequent text line in a separate storing means.

* * * * *